United States Patent [19]
Ihara et al.

[11] Patent Number: 5,469,360
[45] Date of Patent: Nov. 21, 1995

[54] VEHICLE POSITION DETECTING APPARATUS

[75] Inventors: Yasuhiro Ihara, Katano; Mitsuhiro Yamashita, Osaka; Yoshiki Ueyama, Sakai, all of Japan

[73] Assignee: Matsushita Electric Industrial Co., Ltd., Osaka, Japan

[21] Appl. No.: 886,250

[22] Filed: May 21, 1992

[30] Foreign Application Priority Data

| Mar. 10, 1991 | [JP] | Japan | 4-51111 |
| May 21, 1991 | [JP] | Japan | 3-115990 |
| Jun. 24, 1991 | [JP] | Japan | 3-151417 |
| Oct. 17, 1991 | [JP] | Japan | 3-269216 |

[51] Int. Cl.⁶ .............. G05D 1/00; G05D 3/10
[52] U.S. Cl. .......... 364/449; 364/444; 364/450; 364/424.02; 364/460; 340/995; 340/990; 340/905; 340/988; 342/357; 318/587; 73/178 R
[58] Field of Search ............... 364/449, 450, 364/424.02, 424.01, 460, 444, 443, 447; 340/990, 995, 905, 988; 318/587; 73/178 R; 342/357

[56] References Cited

U.S. PATENT DOCUMENTS

| 4,879,658 | 11/1989 | Takashima et al. | 364/449 |
| 4,882,689 | 11/1989 | Aoki | 364/449 |
| 4,926,336 | 5/1990 | Yamada | 364/444 |
| 4,963,864 | 10/1990 | Iihoshi et al. | 340/995 |
| 4,970,652 | 11/1990 | Nagashima | 364/449 |
| 4,999,783 | 3/1991 | Tenmoku et al. | 364/450 |
| 5,043,902 | 8/1991 | Yokoyama et al. | 364/449 |
| 5,046,011 | 9/1991 | Kakihara et al. | 364/449 |
| 5,146,219 | 9/1992 | Zechnall | 340/995 |
| 5,155,491 | 10/1992 | Ando | 342/357 |
| 5,266,948 | 11/1993 | Matsumoto | 340/995 |

Primary Examiner—Kevin J. Teska
Assistant Examiner—Jacques H. Louis-Jacques
Attorney, Agent, or Firm—Wenderoth, Lind & Ponack

[57] ABSTRACT

A correct vehicle position is detected even when the road data to be used in the map match computation includes errors of partial shape. When the matching computing operation of a running locus and the road data obtained from the outputs of a bearing sensor and a distance sensor and a non-match region has been effected by the map match computing means, the non-matching region of the road data and the running locus is detected. The positional error detection caused by errors of the road data is effected by prohibiting map integration.

9 Claims, 29 Drawing Sheets

| number of joints | latitude | longitude | number of adjacent joints | | | | |
|---|---|---|---|---|---|---|---|
| 1 | ····· | ···· | 2 | 6 | 11 | | |
| 2 | ····· | ···· | 1 | 3 | | | |
| 3 | ····· | ···· | 2 | 4 | | | |
| 4 | ····· | ···· | 3 | 5 | 8 | 12 | |
| 5 | ····· | ···· | 4 | 9 | 13 | | |
| ⋮ | ⋮ | ⋮ | ⋮ | ⋮ | ⋮ | ⋮ | ⋮ |

VEHICLE POSITION DETECTING APPARATUS

BACKGROUND OF THE INVENTION

The present invention relates to a navigation system for inducing and guiding a route from a starting point to an object point, and more particularly, a vehicle position detecting apparatus for precisely obtaining the present position of a moving body such as motorcar or the like running on roads.

In the conventional vehicle position detecting apparatus, the moving distance and the advancing direction of the vehicle are obtained respectively from a distance sensor and a bearing sensor. A method is devised of estimating a motorcar position and computing running loci using self-supporting navigation, while effecting correlation with respect to the geography data stored in the memories of a CD - ROM and so on. The conventional vehicle position detecting apparatus is disclosed in, for example, Japanese Laid-Open Patent application Tokukaihei No. 2-130415. The construction of the conventional art is shown in a block diagram in FIG. 33.

A distance sensor 2601 outputs pulse signals for each unit running distance in accordance with the rotation of a tire. The running distance of the vehicle can be known by counting the number of the pulses. The direction sensor 2602 detects the turning angle speed (Yawrate) of the vehicle so as to output signals proportional to the turning rate of the vehicle. The output signals of both the sensors are inputted to a signal processing apparatus 2603 so that here the positions of the vehicle are obtained by the successive computation on the X-Y coordinates. The positional information computed for each unit distance running operation is stored in the running locus storing apparatus 2604. The road data are selectively read in the necessary portion only by the storing medium reproducing apparatus 2606 from what is stored in the map information storing medium 2605. The present positions computed by the signal processing apparatus 2603 are superposed on the surrounding road map and displayed on the display apparatus 2607. The operating apparatus 2608 controls a change in the scale ratio of a map to be displayed and a change in the display direction.

In accordance with the conventional embodiment, the running locus of a vehicle is approximated in broken line in the straightline of a constant distance. The estimated present positions of the vehicle are respectively set on the road during the running operation at present and all the roads to be branched from the road, with the road being also approximated in the broken line as in the locus line. Then, the locus and the road are superposed so that the deviation between the broken line vectors for constituting the locus and the broken line vector for constituting the road. The processing is effected on all the roads, the estimated present position on the road where the deviation of the vectors may become minimum is made the present position. When the roads are complicated in the processing, the number of the extracted roads increases. The distance between the present position deviated from the road and the estimated present position on the road is obtained. By the selection of one smaller than the given value, the estimated present position on the road which becomes a candidate of the present position is reduced so as to reduce the computation load.

There is also a method of effecting the positional calculation of the vehicle by the reception of electric waves from satellites. Generally a whole world positioning system (Global Positioning System, referred to as GPS) generally called an electric wave navigation is used. The electric waves from at least three satellites are received so as to obtain the distance to the satellite for effecting the positioning operation with three-sides location survey. Two methods are used alone or by combination. The present position together with the map information, around the vehicle position, obtained is displayed on the display apparatus such as CRT or the like with the present position of the vehicle being computed.

In order to compute the position of the vehicle with high accuracy, it is necessary to stabilize the output of each sensor. There is a problem in that especially in the distance sensor, a difference is caused between the running distance to be obtained from the output of the distance sensor and the actual running distance due to aging factors such as the air pressure changes and so on of the tire. In order to solve these problems, a positioning position is considered to be used by GPS. For example, in Japanese Tokukaihei No. 1-142412, the distance conversion constant of the distance sensor output was considered to be corrected from the history of the positioning position by the GPS receiver.

In a vehicle position detecting apparatus of the conventional art, the road data of high accuracy is necessary. Much labor is needed to improve the accuracy of the road data. It is impossible to obtain the road data without errors so as to make new roads day by day. It is impossible to make the estimated present position in a correct position unless the roads are described in the road data when, for example, the newly opened road has been passed. Also, the curves are simplified due to data amount reduction, and the intersecting points also may become different in actual shape. The square computation is necessary to compute the distance, which requires a lot of time for the calculation. In the conventional art, the pattern matching between the road data and the locus are effected unconditionally so that the correct positional detection cannot be detected when errors exist in the shape of the road data as the reference. When the shape of the road data is different from the shape of the actual road, there is a problem in that the correct positional detection cannot be effected.

Also, when the GPS is used, especially when the positioning operation is effected with the use of GPS in cities, even when the value of the geometrical accuracy reduction ratio called GDOP in satellite arrangement is small, the positioning accuracy is often reduced due to the influences of the indirect waves reflected by the interference such as buildings of the road surrounding portion, the accumulation of the errors cannot be neglected when the actual running distance has been obtained by the integration of the distance between GPS positioning positions, with a problem that the calibration accuracy of the distance conversion constants of the distance sensor output is lowered.

In a vehicle position detecting apparatus of the conventional art, the user has to correct the road data. The correction of complicated portions which have many intersecting points requires a lot of labor. The road data to be used for the map match processing for obtaining the present position on the road through the comparison between the running locus of the vehicle and the road shape have more information amount as compared with the road data for display use of the information and so on about the connection of the road so as to require a large amount of labor, with a problem that the correct positional detection cannot be effected unless the user has to effect the proper correction.

SUMMARY OF THE INVENTION

Accordingly, an essential object of the present invention is to provide a position detecting apparatus which is less influenced by the map data, and can effect a map matching operation of superior computing speed and accuracy.

Another important object of the present invention is to provide a vehicle position detecting apparatus which corrects the distance sensor output and computes the vehicle position with high accuracy, while considering the accuracy of the positioning by the absolute-position computing means for directly obtaining the latitude-longitude of the vehicle of GPS, sign post and so on.

In accomplishing these and other objects, according to one preferred embodiment of the present invention, there is provided a vehicle position detecting apparatus which comprises a bearing sensor for detecting the advancing bearing of a vehicle, a distance sensor for detecting the running distance of the vehicle, a present position estimating means for estimating the present position of the vehicle with respect to the reference position with the use of the advancing bearing from the above described bearing sensor and the running distance from the above described distance sensor, a map storing means for storing the road data, a map range selecting means for estimating the error amount of the road data stored in the above described map storing means so as to decide the evaluation range, a map match computing means for effecting the map match computing operation, correcting the present position on the map road with the use of the present position computed by the above described present position estimating means and the evaluation range selected by the above described map range selecting means, an output means for outputting the present position of the vehicle corrected by the above described map match computing means.

A vehicle position detecting apparatus where a bearing correcting means is provided, the above described bearing correcting means respectively obtains the varied amount in the advancing bearing of the vehicle and the bearing of the road data before and after the windings matched by the map match computing means, and corrects the advancing bearing when the difference is smaller than the given value.

A vehicle position detecting apparatus, where a bent road judging means is provided, the above described bent road judging means judges whether or not the vehicle is running on the bent road, makes the tolerance error amount large at the map match computing time when the vehicle has been judged to be running on the bent road.

Also, a vehicle position detecting apparatus where the bent road judging means judges the vehicle is running on the present bent road when the number of the roads in the road data within the given range including the present position is a given value or less, the moving locus of the vehicle computed by the present position estimating means is bent so as to make the tolerance error amount larger at the map match computing time.

Also, a vehicle position detecting apparatus where the bent road judging means judges the vehicle is running on the bent road at present when the number of the intersecting points in the road data within the given range including the present position is a given value or less, the moving locus of the vehicle computed by the present position estimating means is bent.

A vehicle position detecting apparatus comprising a bearing sensor for detecting the advancing bearing of the vehicle, a distance sensor for detecting the running distance of a vehicle, a present position estimating means for estimating the present position from the output of the above described bearing sensor, from the output of the above described distance sensor, a map storing means for storing the road network data, a map match computing means for making the present position the above described present position estimating means estimated conform to a point on the road network the above described map storing means stores, a temporary position computing means for computing with the use of the above described road network data the temporary position the above described map match computing means uses in the matching operation of the present position, an output means for outputting the present position matched by the above described map match computing means, the above described map match computing means, when the vehicle has approached a curve, or has been escaped from a curve, calculates an advancing bearing between the temporary position computed by the above described temporary position computing means and a point to be recognized as the present position so as to compare the output of the above described bearing sensor for selecting the most suitable one as the present position from among the points to be recognized as temporary position and the present position for matching the present position.

A vehicle position detecting apparatus comprising a bearing computing means for computing the advancing bearing of a vehicle, a distance computing means for computing the moving distance of a vehicle, a map storing means for storing a map data, a present position estimating means for estimating the position of the vehicle with the use of the outputs of the above described bearing computing means and the above described distance computing means, the above described distance computing means, an outputting means for outputting the vehicle position obtained by the above described present position estimating means, an absolute position computing means for computing the position of the vehicle with latitude, longitude, a position detecting means for obtaining a possible existence range of a vehicle with an absolute position computed by the above described absolute position computing means provided as a reference, for detecting the estimating position obtained by the above described present position estimating means and the inclusion relation of the possible existence range, a distance constant correcting means for computing the distance computing errors from the estimating position and the possible existence range at the terminal point, correcting the distance conversion constant of the above described distance computing means output from the distance calibration section length and the distance computing errors with the above described detecting means detecting that the estimating position is included in the possible existence range at the starting point of at least a distance calibrating section, but is not included at the terminal point.

A vehicle position detecting apparatus which is provided with a road length computing means for obtaining the moving distance of the vehicle as the integration value of the length of the road with the use of the map data of the above described map storing means, the above described distance constant correcting means corrects the distance conversion constant of the above described distance computing means output with the use of the road length obtained by the above described road length computing means.

A vehicle position detecting apparatus includes a satellite combination judging means for judging the combination of the satellites used for computation of the absolute position by the above described absolute position computing means, instead of the above described position detecting means, with the absolute position computing means using the whole world positioning system, a straight advance judging means for judging the straight advance condition of the vehicle, characterized in that the above described distance constant correcting means corrects the distance between the absolute positions of the vehicle obtained by the above described absolute position computing means and the distance conversion constant from the output integration value of the above described distance computing means when the combination of the satellites is constant by the above described satellites combination judging means and the vehicle has been judged to be straight by the above described straight advance judging means.

A satellite position detecting apparatus provided with a vehicle speed computing means for computing the moving speed of the vehicle, the above described distance constant correcting means corrects the distance conversion constant of the above described distance computing means output in the distance calibration section of a constant value or more in the vehicle speed obtained by the above described vehicle speed computing means.

A vehicle position detecting apparatus provided with a road type judging means for specifying the road type of running road with the use of a map storing means, characterized in that the above described distance constant correcting means corrects the distance conversion constant of the above described distance computing means output in the distance calibration section to be judged as a high speed road or a toll road by the above described road type judging means.

By such construction as described hereinabove, the error amount of the road data is estimated, correct position detection can be effected independently of the errors of the road data for effecting the pattern matching with respect to the locus with the use of the evaluation range selected from a small portion in the error amount.

Also, in order to correct the bearing of the bearing sensor from the bearing of the road data with the use of the road data small in the selected error amount, the correct bearing correcting can be effected so as to improve the positional detection accuracy.

In order to strengthen the drawing out operation to the road of the map matching by the detection of the mountain roads and bent roads where the errors of the road data are especially large, the errors of the sensor data becomes large due to the road slope, the correct positional detection can be effected.

As the most suitable present position is selected from among the temporary position and the present position with the temporary position being set so as to renew the present position in the curve, the map matching in the curve can be effected more correctly without different feeling.

It is handled as the possible existence range considering the error range, instead of a point with the absolute position obtained by the absolute position computing means in the positional detecting means. The position obtained by the preset position estimating means is used as an examination as to whether or not the position is included in the range. After the running operation to some extent with the examined position as a starting point, the distance computing error is obtained from the position obtained by the present position estimating means and the possible existence range of the vehicle so as to correct the distance conversion constant by the distance constant correcting means. The position of the vehicle can be computed while the output of the distance computing means being calibrated with high accuracy without the accumulation of the positioning error by the absolute position computing means.

The distance computing accuracy is high as the moving distance of the vehicle is computed from the addition of the road length of the map data with the use of the road length computing means. As the distance conversion constant is corrected by the distance constant correcting means from the value, the position of the vehicle can be computed while the output of the distance computing means is being calibrated with high accuracy without accumulation of the positioning errors by the absolute position computing means.

When the vehicle is judged in a straight advancing operation by the straight advance judging means, and the combination of the satellites used in the positioning by the satellite combination judging means is judged to be constant, the moving distance of the vehicle is computed from the position obtained by the absolute position computing means, the error accumulation is less in the moving distance computation of the vehicle as compared with a case where the combination of the satellite is not restricted, so that the position of the vehicle can be computed while the output of the distance computing means is calibrated with high accuracy.

The present invention comprises, as a first means, a non-matching region detecting means for detecting the non-matching region of the road data and the running locus from the results of the map matching operation, a non-matching region storing means for storing the region, a match prohibiting region judging means for prohibiting the match computation in the non-matching region.

The present invention comprises, as a second means, a non-matching region detecting means for detecting the non-matching region of the road data and the running locus from the results of the map match computation, a non-matching region storing means for storing the running locus together with the region, a match prohibiting region judging means for prohibiting the match computation in the non-matching region.

According the first means, the region where errors exist in the road data at the map match computing time is automatically judged, correct positional detection independently of the errors of the road data by the prohibition of the map matching in the region at the running time of the next time and its subsequent.

According to the second means, the map matching operation is prohibited when the vehicle has run on the same road, the same direction in the same region as at that time by the storing, at the same time, of the running locus when it has been judged that errors exist in the road data. The correct positional detection can be effected independently of influences upon the errors of the road data.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
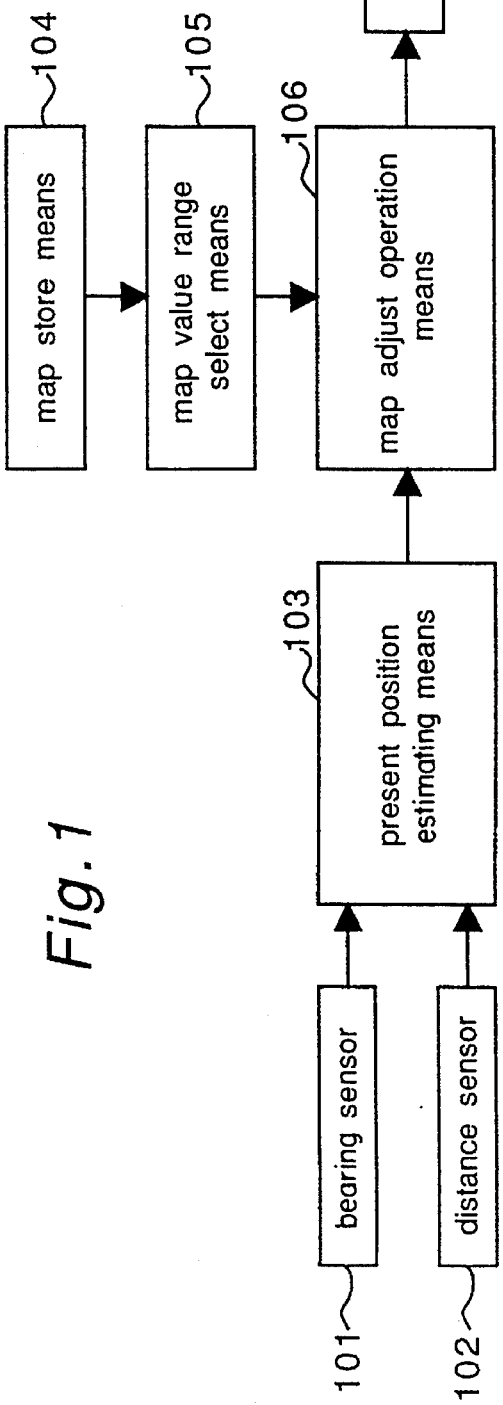
FIG. 1 is a block diagram of a vehicle position detecting apparatus in a first embodiment.

Before the description of the present invention proceeds, it is to be noted that like parts are designated by like reference numerals throughout the accompanying drawings.

(Embodiment 1)

Figure 4:
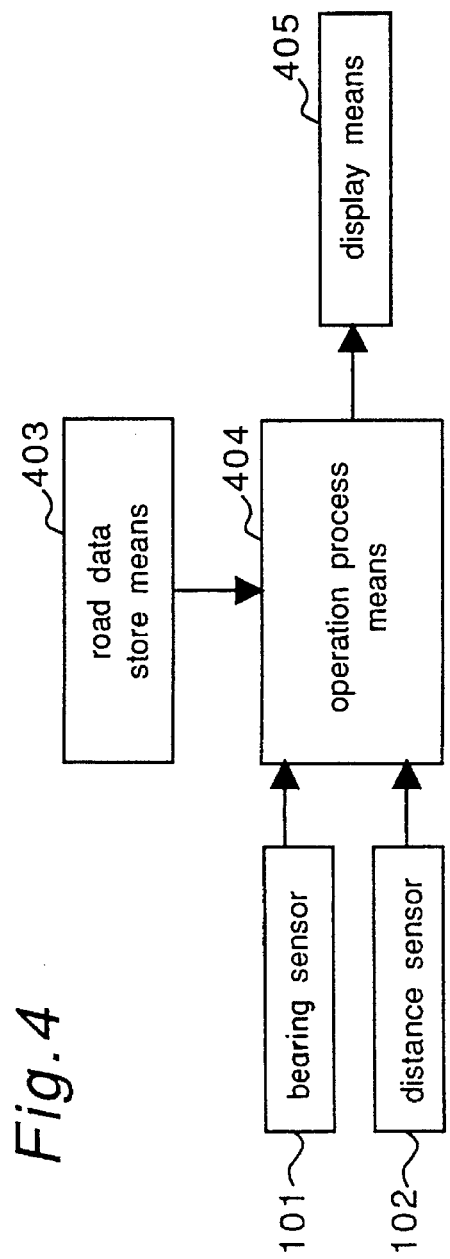
FIG. 4 is a hard construction view of a vehicle position detecting apparatus in a third embodiment from the first embodiment.

FIG. 4 is a hard construction view of a vehicle position detecting apparatus to be applied to a third embodiment from a first embodiment of the present invention. Reference numeral 401 is a bearing sensor of high accuracy, an optical fiber gyro (hereinafter, referred to as optical gyro) is used in the present embodiment. In addition, for example, oscillating rate gyro, gas rate gyro or the like may be used. Reference numeral 402 outputs a pulse signal for each unit running distance in accordance with the rotation of the tire by a distance sensor. Reference numeral 403 is a road data storing apparatus, for example, a CD-ROM with road data being stored in it, a CD-ROM player for reading it are used. Reference numeral 404 is a computation processing apparatus which is a microcomputer provided with I/O for loading the sensor data and the road data. Reference numeral 405 is a display apparatus such as display or the like.

FIG. 1 is a block diagram of a vehicle position detecting apparatus to be applied to a first embodiment of the present invention.

In FIG. 1, reference numeral 101 is a bearing sensor of high accuracy. In the present embodiment, an optical gyro is used. Reference numeral 102 is a distance sensor. A wheel speed sensor and a shaft sensor are used. Reference numeral 103 is a present position estimating means so as to compute the present position of the wheel with respect to the reference position in accordance with the output from the bearing sensor 101 and the distance sensor 102. Reference numeral 104 is a map storing means so as to store the road data described in the map. Reference numeral 105 is a map range selecting means so as to select the map range to be used in the map match computation from a portion less in the error of the road data. Reference numeral 106 is a map match computing means so as to effect the pattern matching operation with a running locus which is a locus to be made of the present position of the vehicle computed by the present position estimating means 103 and the present position from the past, and road data within the map range to be obtained by the map range selecting means 105 so that the present position of the wheel is corrected on the road. Reference numeral 107 is an output means for displaying, on a display or the like mounted on the vehicle, the present position of the vehicle computed by the map match computing means 106.

The vehicle position detecting apparatus in the first embodiment constructed as described hereinabove will be described hereinafter in its operation. Although the present invention can be realized use hardware, a case where processing has been effected with software with the use of a microcomputer or the like is described in the present embodiment.

An object in the first embodiment is to estimate the error amount of the road data, select the map range from a portion small in the error amount, and effect the positional detection of high accuracy without influences of the errors of the road data for the matching with the locus.

Figure 5:
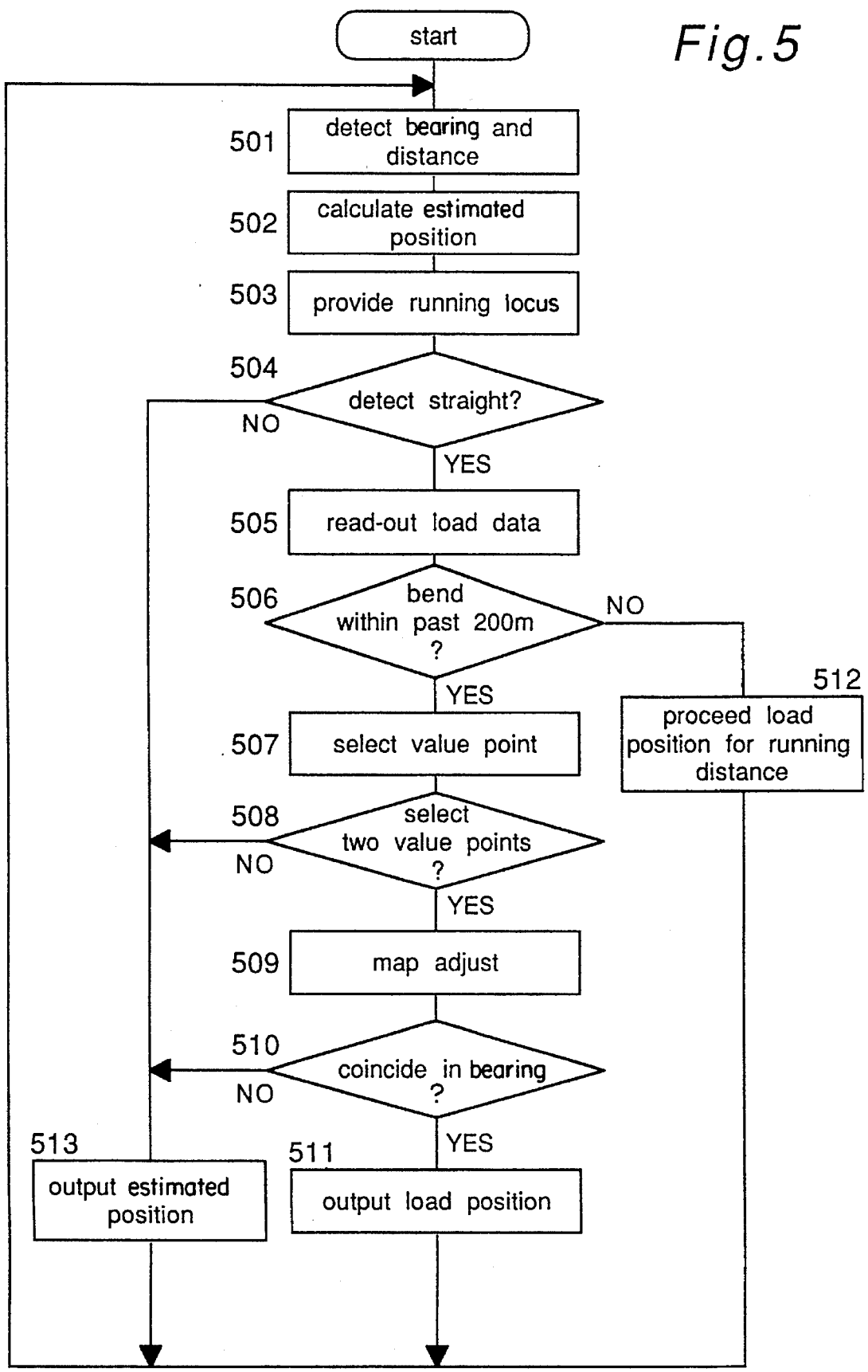
FIG. 5 is a flow chart for illustrating the operation in the first embodiment.

FIG. 5 is a flow chart showing a step of the positional detection in the first embodiment. The operation will be described in accordance with it. It is necessary to set the initial position at the appliance setting time. The coordinates of the position of the vehicle are manually inputted or may be set using external information or the like of the electric wave navigation and so on. Once they are set, it is not necessary to set again by the storing operation of the position where the vehicle stopped previously, so that the setting of the initial position is normally unnecessary. Once manual setting, and bearing setting by the external information are effected similarly even in the use of the sensor, for the bearing sensor, which detects the turning angle of the vehicle of an optical gyro, an oscillation rate gyro and so on, it is normally unnecessary to set the absolute bearing.

At a step 501, the advancing bearing and the running distance of the vehicle are detected each time the vehicle runs for unit distance (for example, 5 m). When the optical gyro is used for a bearing sensor, the advancing bearing D becomes $$D=D'+Ta \quad (1)$$

D' is an absolute bearing to be obtained up to the previous time, Ta is a turning angle detected by the optical gyro during the unit distance running operation.

At the next step 502, the estimating position of the vehicle is computed by the following formulas with the estimating position of the vehicle to be obtained up to the previous time as the reference position.

$$X=X'+L\cos D \quad (2)$$

$$Y=Y'+L\sin D \quad (3)$$

wherein X, Y are estimating position coordinates of the vehicle, X', Y' are estimating position coordinates of the vehicle at the previous time, L is a running distance, D is an advancing bearing. At a step 503, the estimating position coordinates are sequentially stored so as to make the running locus by the completion of the respective coordinate intervals with straight lines. Although described, later, the straight line portion of the road is generally higher in accuracy than the bent portion, because the road data are approximated in straight lines in the shape of the road. For an matching operation to the road data, the straight advancing portion becomes necessary in the running locus so as to judge whether or not the vehicle was in the straight advancing condition at the step 504. Assume that the condition is a straight advancing one when the variation angle in the advancing bearing in, for example, 50 m section is 5° or lower. When the vehicle was in a straight condition, the step advances to the processing of step 505 and its subsequent. When the vehicle is not in the straight advancing condition, the estimating position of the vehicle is displayed at a step 513 to complete one processing. At a step 505, the road data used by the map match computing means 106 is loaded at a step 505. The road data exist within La (for example, 50 m) from the estimated position of the vehicle and is closest to the estimated position. In the map match computing means 106, the correlation of the running locus and the road data is computed when one bend (or winding) or more exist between two straight advancing portions. The processing for setting the position on the road is main and the present position on the road is advanced when the vehicle is simply in a straight advance. At a step 506, it is judged whether or not the bend was within the past constant distance (for example, 200 m). This judges whether or not the varying angle in the advancing bearing is 10° or lower in the section. When the bend exists, the step moves to a step 507. When it does not exist, the present position on the road on which the vehicle is running at present is moved at a step 512 by running distance portion so as to complete one processing.

In the present embodiment, a map match computing operation is effected with the use of the points in the road data. At a step 507, a selecting operation of a map evaluation point from a map range which is a portion less in the error of the road data. The errors of the road data will be described.

In the case of Japan, the road data are based on a topographical map and so on issued by Land Geography company of Kokudo-chiliin in Japan. The shapes of the roads described in the map are approximated in straight lines, are stored in geography storing medium of CD-ROM or the like with the respective straight lines being expressed in the shape of the vectors.

Figure 6A:
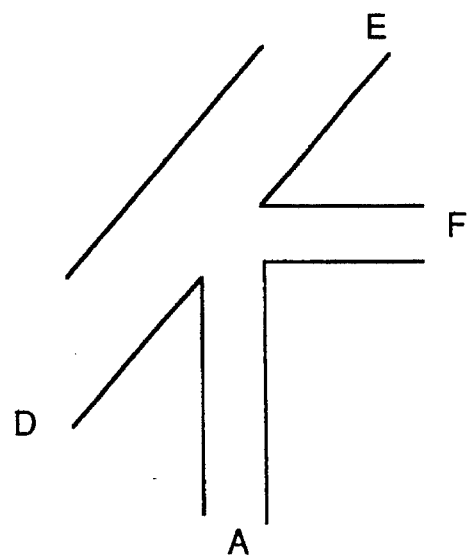
FIGS. 6 (a) and 6 (b) are view showing drawn up examples of a road data.
Figure 6B:
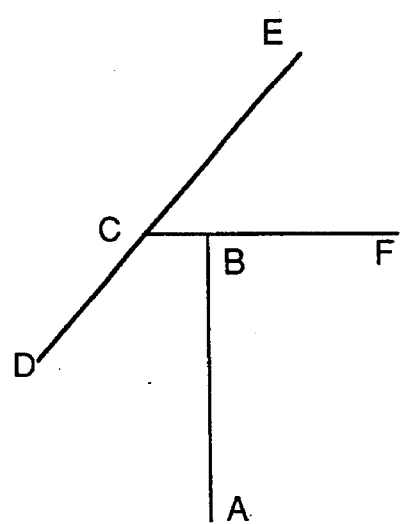
Figure 7A:
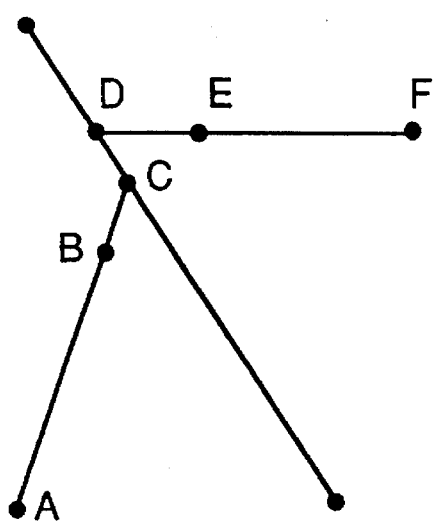
FIGS. 7 (a) to 7 (d) are views for illustrating a map match computation in the first embodiment.
Figure 7B:
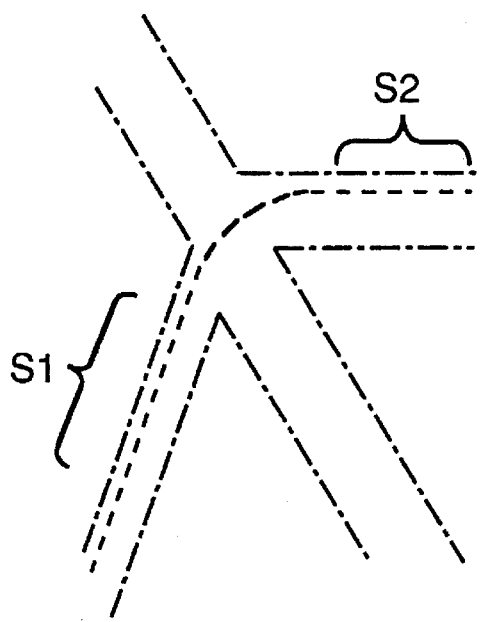
Figure 7C:
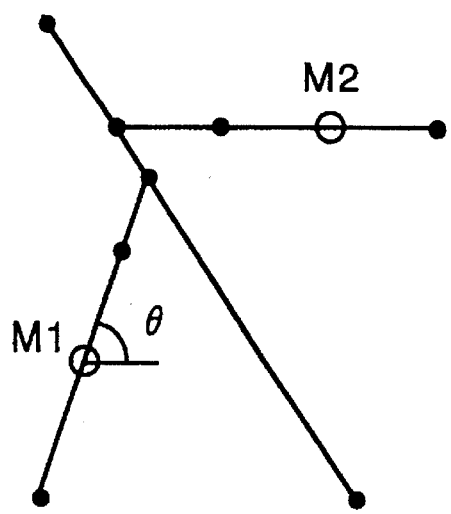
Figure 7D:
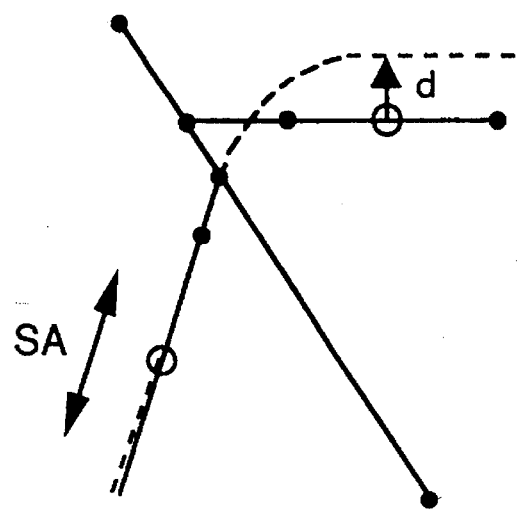

The storing systems are respectively the same in a point where the roads are approximated in straight lines although the starting point of the vector and the terminal point thereof are stored in various type of methods. The vectors are made segments. Also, although the correct shape may be approximated when the approximation is effected with very short straight lines even if the straight line approximation is provided, the data amount and the accuracy may be actually compromised with the practical lines as the data amount increases. A problem point to be caused when the roads have been approximated with strength lines will be described with reference to FIG. 6. When the road is of such a shape as in FIG. 6 (*a*), it may be provided as in FIG. 6 (*b*) as the road data is composed from the central line of the road. In the actual road, the shape of the the running locus of the vehicle between B-C of the road data and the shape of the road data becomes largely different when the reaching operation can be effected with one slow right turning from A point to E point. The error of such road data gives bad influences to the accuracy and reliability of the map match processing. For example, in a method shown in the conventional embodiment, the candidates of the present position can be considered by plurality. The order judgment becomes mistaken when the error exists in the right road, thus resulting in the wrong calculation of the present position. At the step 507, it is judged that the error amount of the road data for filling the following two conditions is small.

Assume that one road vector data are called road segments.

1) Length of the road segment is longer than Ld (for example, 100 m).
2) The difference between the direction of the road segment as an object and the direction of the road segment to be connected before and after it is smaller than the value (for example, 20°).

As the coordinate-bearing accuracy of the intermediate points of the segment is considered the highest even among the road segments, the intermediate points of the road segments for filling the above described conditions are assumed as the map evaluation points. Then, at a step 508, it is judged whether or not the map evaluation point of two points has been obtained before and after the bend. When the evaluation points have been obtained, the map match computing operation is carried out at a step 509. When the evaluation points have not been obtained, the estimating point is outputted at a step 513 so as to complete one processing.

The map match computing method at a step 509 will be described hereinafter with reference to FIG. 7. FIG. 7 (*a*) is one example of the road data where the segments of connecting a point with a point are road segments already provided. Assume that the running locus when the vehicle has run from A to F on such road data is shown in FIG. 7 (*b*) (S1, S2 are straight advancing portions before an after the winding). In the conventional method at this time, the error between C-D of FIG. 7 (*a*) becomes a problem. The map evaluation point obtained at a step 507 becomes M1 and M2 of FIG. 7 (*c*), with the bearing at the M1 becoming θ. One point in the straight advancing portion S1 before the winding of the running locus is made to conform to the coordinate of the M1. When the error of the advancing bearing is large, the running locus is made to conform to the M1, and at the same time, the locus may be rotated so that the bearing at a point for conforming it to the M1 may become θ. Thus, the absolute coordinates of each point of the running locus can be decided. The shortest distance d between the M2 and the locus is obtained (see FIG. 7 (d)). The point of the straight advancing portion S1 for conforming it to the M1 is shifted by a given distance (for example, 10 m) within the given range SA (for example, 200M) so as to obtain d again.

The coordinate of the M1 is given to a point where it has been conformed to the M1 when the minimum d has been given so as to decide the coordinates of the tip end of the running locus, namely, the present position.

At a step 510, the bearing in the M2 is compared with the bearing of the running locus away by d from the M2. When the difference between the bearings is Da (for example, 10°) or lower, a vertical line is lowered to a road segment including the M2 or connecting with the M2 from the tip end of the running locus at a step 511, with its foot being expressed as the present position. When the difference between the bearings is a given value or more, the estimating position is shown at a step 513 so as to complete one processing.

According to the present embodiment as described hereinabove, the portion larger in the error amount of the road data is not used in the matching calculation, thus allowing the detection of the stable present position to be effected.

(Embodiment 2)

Figure 2:
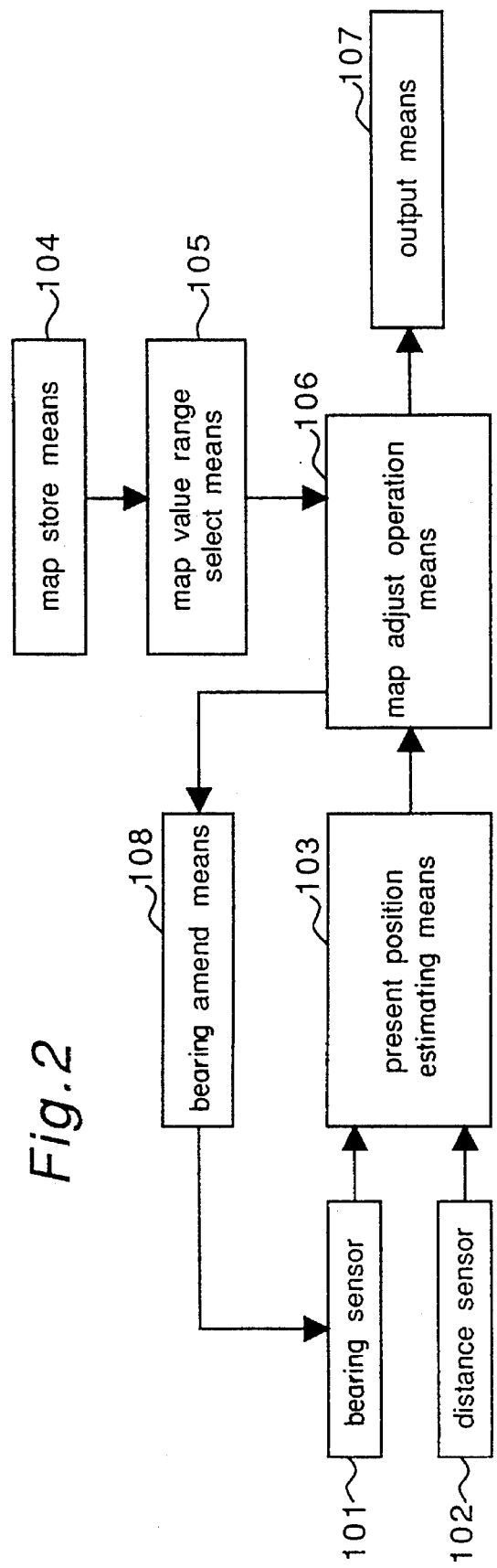
FIG. 2 is a block diagram of a vehicle position detecting apparatus in a second embodiment.

A second embodiment of the present invention will be described hereinafter. A block diagram in the present embodiment will be shown in FIG. 2. In the drawing, like parts are designated by like reference numerals throughout the accompanying drawings. In the embodiment, a bearing correcting means 108 is provided in addition to the first embodiment, the accumulation of the bearing errors is removed by the correction of the absolute bearing from the results at the match computing operation by the map match computing means, with an object of realizing the bearing calibrating operation of the high accuracy. The operation of the present embodiment will be described hereinafter with reference to FIG. 8.

The optical gyro is very small in drift and also the scale error is small. The relative bearing can be correctly detected in the section of several hundreds m. The accumulation of the errors in the absolute bearing cannot be avoided for the calculation of the absolute bearing through the integration of the running angle of the vehicle. Although it is considered to set the absolute bearing with the use of the bearing of the road data, the accuracy of the turning angle by the optical gyro is very high. The bearing accuracy is lowered reversibly when the absolute bearing is set from the bearing of the road data including the large bearing error. The error amount of the road data is estimated and only the data small in the error amount is used. The absolute bearing setting operation of the high accuracy may be effected. Here the relative bearing between the evaluation points on the road data is compared with the relative bearing by the optical gyro so as to correct the absolute bearing when both are in conformity to each other with the use of the bearing of the road data.

Figure 8A:
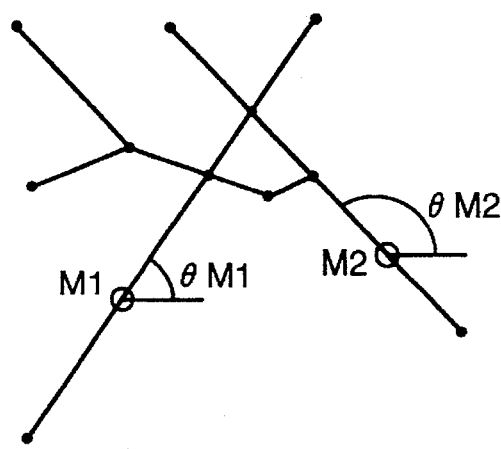
FIG. 8 (a) and 8 (b) are views for illustrating a bearing correct processing in a second embodiment.
Figure 8B:
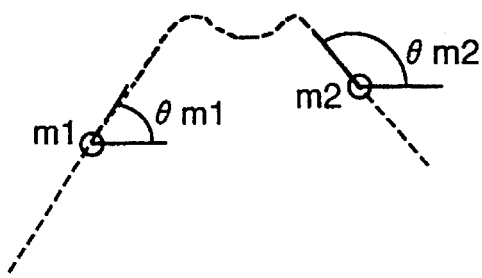

The flow of the processing will be described with reference to FIG. 5 as it is similar to that of the first embodiment. The correction of the bearing is carried out when the map match computing operation is effected at a step 509 used in the description of the first embodiment. The operation at the other step is the same as in the first embodiment. FIG. 8 (a) is an example of the road data, the (b) is a running locus when the vehicle has run on the road. Assume that the points on the locus conformed to the map evaluation points M1, M2 before and after the winding by the above described match computation are m1, m2. In the embodiment, three times of right, left turnings are effected between the evaluation points in the preset embodiment, the bearing can be corrected by the completely similar processing even in a case one time of turning has been effected. When the locus and the road data have been matched like this, the bearing difference θmap in the evaluation points M1, M2 are computed as $$\theta map = \theta M1 - \theta M2 \qquad (4)$$

Similarly, the bearing difference θloc at the m1, m2 about the running locus is $$\theta loc = \theta m1 - \theta m2 \qquad (5)$$

$$|\theta map - \theta loc| < Ea \qquad (6)$$

wherein the present running bearing D is corrected by the following formula when the conditions of a threshold value Ea (for example, 5°) of the bearing correction angle has been filled.

$$D = D' + \alpha * (\theta M2 - \theta M2) \qquad (7)$$

α is a correction coefficients, numbers of 0 through 1, for example, 0.5 and its subsequent, the making of the running locus, map matching and so on are effected in accordance with the flow described in the first embodiment with the use of the corrected absolute bearing D so as to effect the positional detection.

According to the present embodiment as described hereinabove, variation amounts in the bearing of the road data and the bearing of the locus before and after the winding are respectively obtained after the selection of a portion smaller in the error amount of the road data. As the bearing is corrected when the difference is small, the bearing correction of the high accuracy may be effected.

In the present embodiment, the bearing is connected each time the map matching operation has been carried out. The error of the bearing is estimated from what is led to errors in the absolute bearing such as total of the passing time and the turning angles from the previous bearing correction. When the estimated value of the errors has exceeded the given value (for example, 10°), the correction of the bearing described in the present embodiment may be carried out.

(Embodiment 3)

Figure 3:
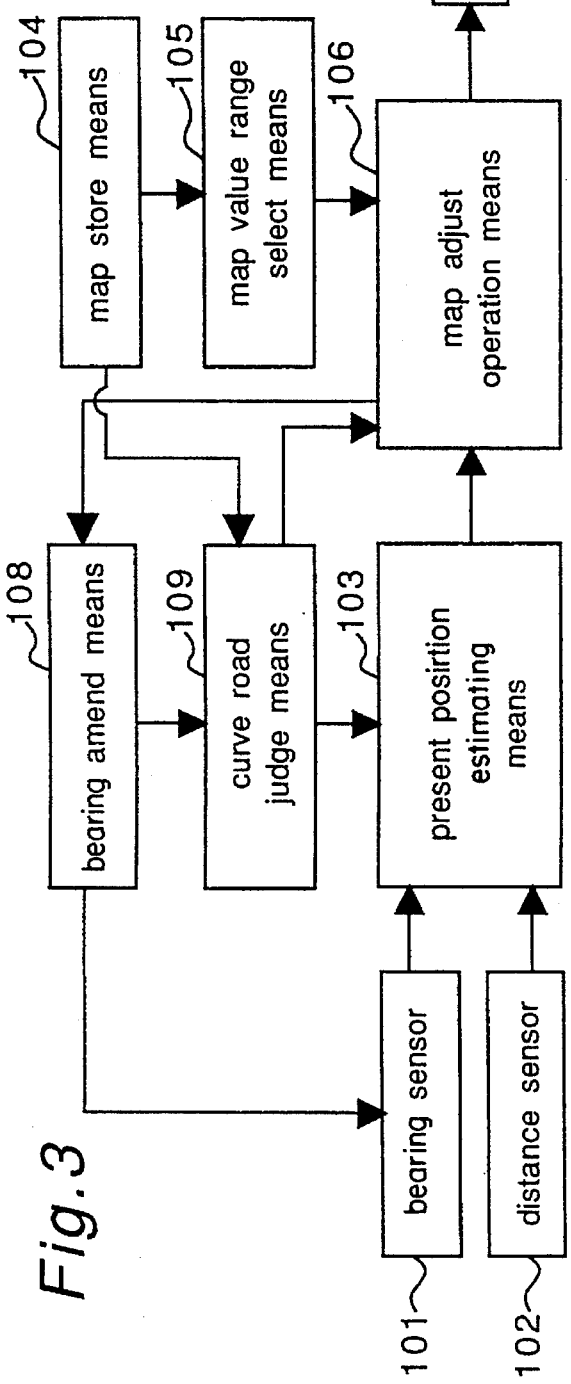
FIG. 3 is a block diagram of a vehicle position detecting apparatus in a third embodiment.

The third embodiment of the present invention will be described hereinafter. FIG. 3 shows a block diagram of the present embodiment. In the drawing, the like parts are designated buy like reference numerals throughout the accompanying drawings. In the embodiment, a bent road judging means 109 is provided in addition to the second embodiment. It is judged that the error amount is particularly large from the road data of the present position and the map storing means 104 by the present position estimating means 103, with an object that the positional detection of high accuracy may be effected even when the error amount of the road data has increased through the variation of the error tolerance amount at the match computing time in the map match computing means 106. The operation of the present embodiment will be described hereinafter.

The road data are made by the straight advance approximation as described hereinabove and the increase of the data amount is restrained so that the shape of the curve is large changed. It will be described with reference of FIG. 9. FIG.

Figure 9A:
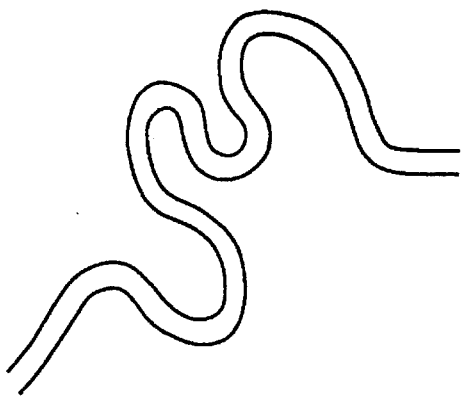
FIGS. 9 (a) and 9 (b) are views showing drawn up examples of road data in a bent road.
Figure 9B:
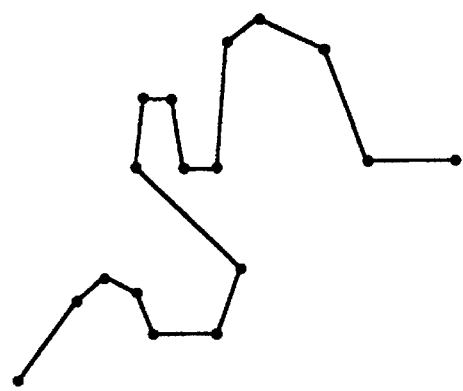

9 (a) is a shape of the actual road in the bent road. FIG. 9 (b) is an example of a road data showing the road. In the road less in the straight line portion, the actual road shape is large different from the shape of the road data. When the vehicle has run on such a road, the the large deviation is caused in the position and the bearing of the running locus and the road data, the matching operation is hard to effect, and the position detecting accuracy when matched is lower than the general road. As the match computation is effected with the use of the straight line portion of the road data where the error of the road data is estimated to be less in the first embodiment, chances are fewer of carrying out the match computation in the bent road and the mountainous road of many curves. In the mountainous roads, the errors several times as many at the normal running time even in the advancing bearing by the optical gyro are caused by the rolling of the vehicle body by the slopes of the road and the abrupt turns. As the error amount of both the road data and the running locus increases, the normal map matching operation cannot be effected. It is considered that the user has no different feeling if the present position is obtained in the road at this time. When the same matching computation as it is normal is effected, the present position is obtained in a point too away from the correct position because of the error in the advancing bearing obtained from the optical gyro. It is necessary to strengthen the drawing out to the road by the enlargement of the tolerance error amount at the match computing time.

The flow of the processing will be described with reference to FIG. 5 as it is similar to that in the first embodiment. The judgment of the bent road is effected immediately before the loading of the road data at the step 505. When it has been judged to run on the present bent road, the drawing out operation can be strengthened to the road by the same processing as it is normal by the change in each constant to be described later. Namely, the operation at the other step is the same as in the first embodiment. A method of judging whether or not the road the vehicle runs at present is bent road or mountainous will be described hereinafter.

Figure 10A:
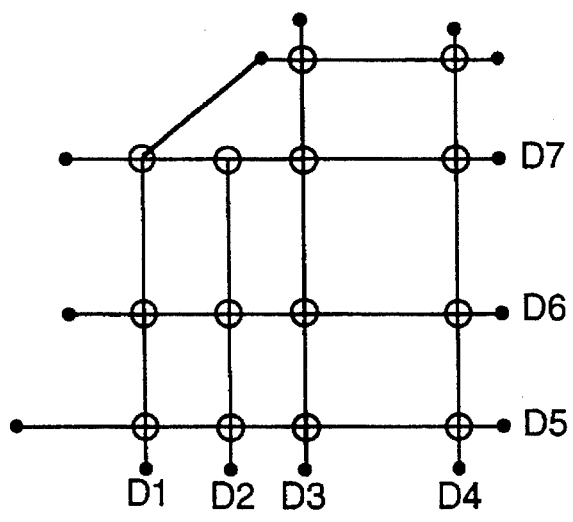
FIGS. 10 (a) and 10 (b) view showing drawn up examples of road data in city streets and a bent road.
Figure 10B:
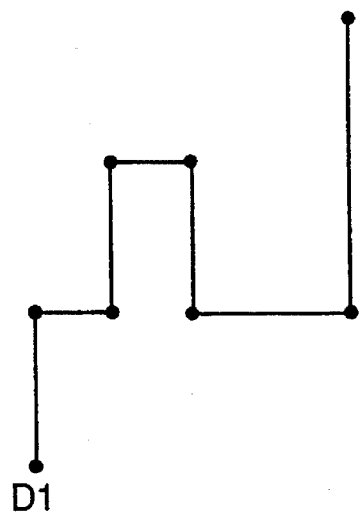

At a step 505, the road data existing within a constant range (for example, 200 m) including the present position computed by the present position estimating means is obtained from the map storing means. FIG. 10 is an example of a road data to be included within the range. FIG. 10 (a) is an example of the road data on the city streets, FIG. 10 (b) is an example of the road data in the bent road. D1 through d7 show the names (or numbers) of the roads. The black circles are terminal points (connecting points) of the simple road segments, the white circles are the terminal points of the road segments showing the intersecting points. In the roads of FIG. 10 (a), assume that the running loci when the vehicle has run D1→D6→D2→D7 →D3→D6→D4 are completely the same as vehicle has run on the road of FIG. 10 (b). As it is impossible to judge the bent road by the running locus, the judgment of the bent roads is carried out as follows with the use of the road data.

If a road segment group for computing one road is road data stored as one road, the number of the road (number of D) within the above described range is investigated. It is detected that the vehicle is running on the bent road or the mountainous road when the number thereof is a given value (for example, two) or lower, and the total of the absolute values of the bearing change amount of the running locus is a given value (for example, 360°) or more.

It is detected that the vehicle is running on the bent road or the mountainous road when the number of the intersecting points in the road data within the above described range is a given value (for example, four points) or lower and the total of the absolute values of the bearing change amount of the running locus is a given value (for example, 360°) or more.

When the bent roads or the mountainous roads can be detected as described hereinabove, the drawing in to the road is strengthened by the following method. The value of each constant before the change is one as shown in the first embodiment.

(1) Enlargement of La at the road data search time near the vehicle estimating position (50 m →150 m)
(2) Contraction of Ld of the conditions for selecting evaluation points (100 m→50 m)
(3) Enlargement of a drawing in bearing error Da at the match computing time (10°→20°)

The loading (step 505) of the road data, the selection (step 507) of the evaluation point, the processing of the map matching (step 509) are processed in a similar flow to the first embodiment after the change in such each constant, the drawing in onto the road of the present position can be strengthened.

According to the present embodiment as described hereinabove, it is judged that the error amount of the road data is in large condition in the bent road and the mountainous road. As the error tolerance amount at the match computing time is changed and the drawing in to the road is strengthened, the stable present position can be detected even if the error of the road data·advancing bearing.

Although the total sum of the absolute values of the varying angle of the advancing bearing detected by the bearing sensor mounted on the vehicle in the present embodiment is a given value or more and is made one portion of detecting conditions in the bent road or the mountainous road. Instead, the total sum of the absolute value of the bearing change amount of the road segment to be-used in the map matching may be used.

(Embodiment 4)

Figure 11:
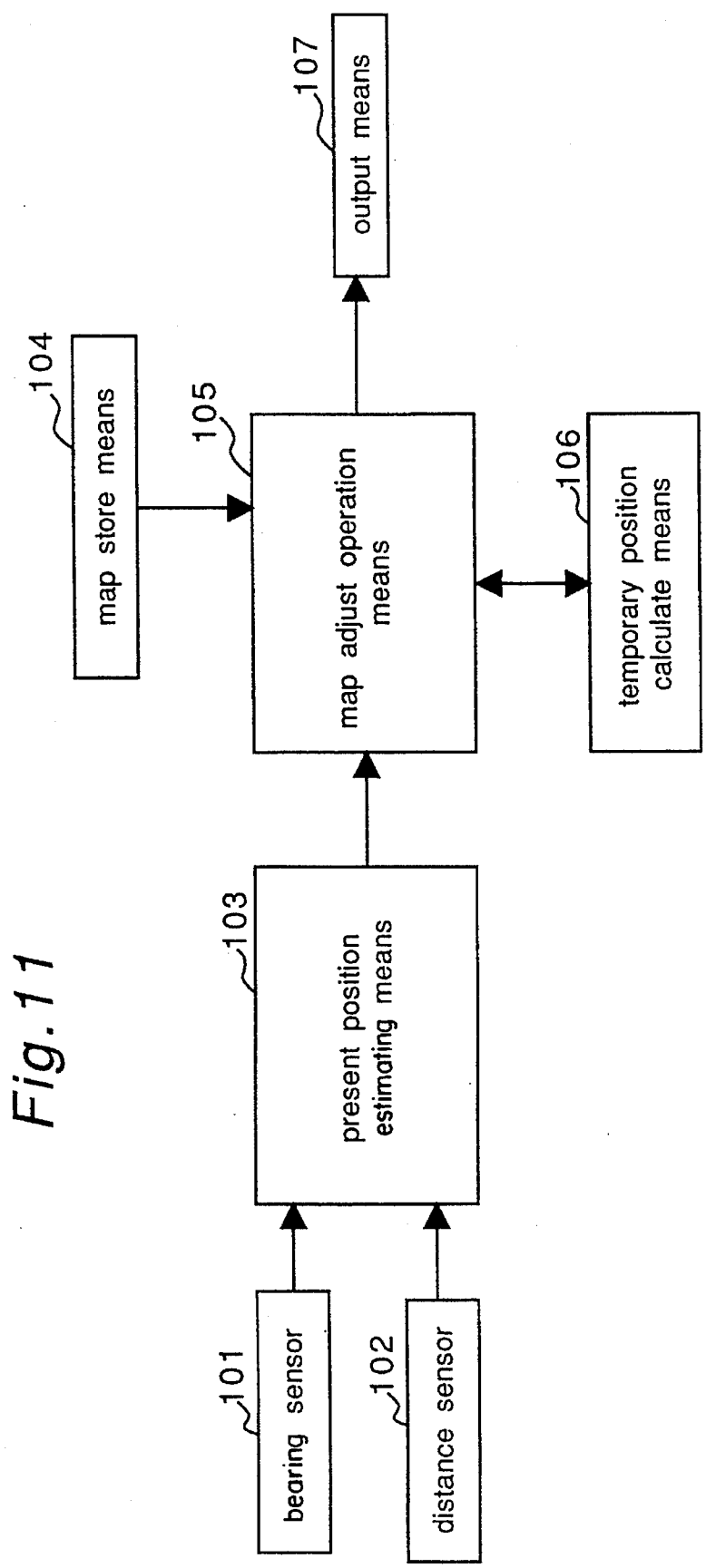
FIG. 11 is a block diagram of a vehicle position detecting apparatus in a fourth embodiment.

A fourth embodiment of the present invention will be described hereinafter. In the map matching operation, a problem is a portion of many curves in mountainous roads and so on. The present embodiment realizes the map matching operation without a different feeling even in the curve, considering the errors in the curves. FIG. 11 shows the block diagram of the present embodiment. Even in the drawing, like parts are designated by like reference numerals throughout the accompanying drawings. A temporary position computing means 110 is provided in addition to the first embodiment. The map match computing means 106 computes the temporary position by the temporary position computing means 106 when the vehicle is approaching the curve or has been escaped from the curve. By the comparison in the advancing bearing between the temporary position and a point recognized as the present position, the map matching can be realized without a different feeling even in the curve by the matching of the present position. The present embodiment will be described hereinafter.

Figure 13:
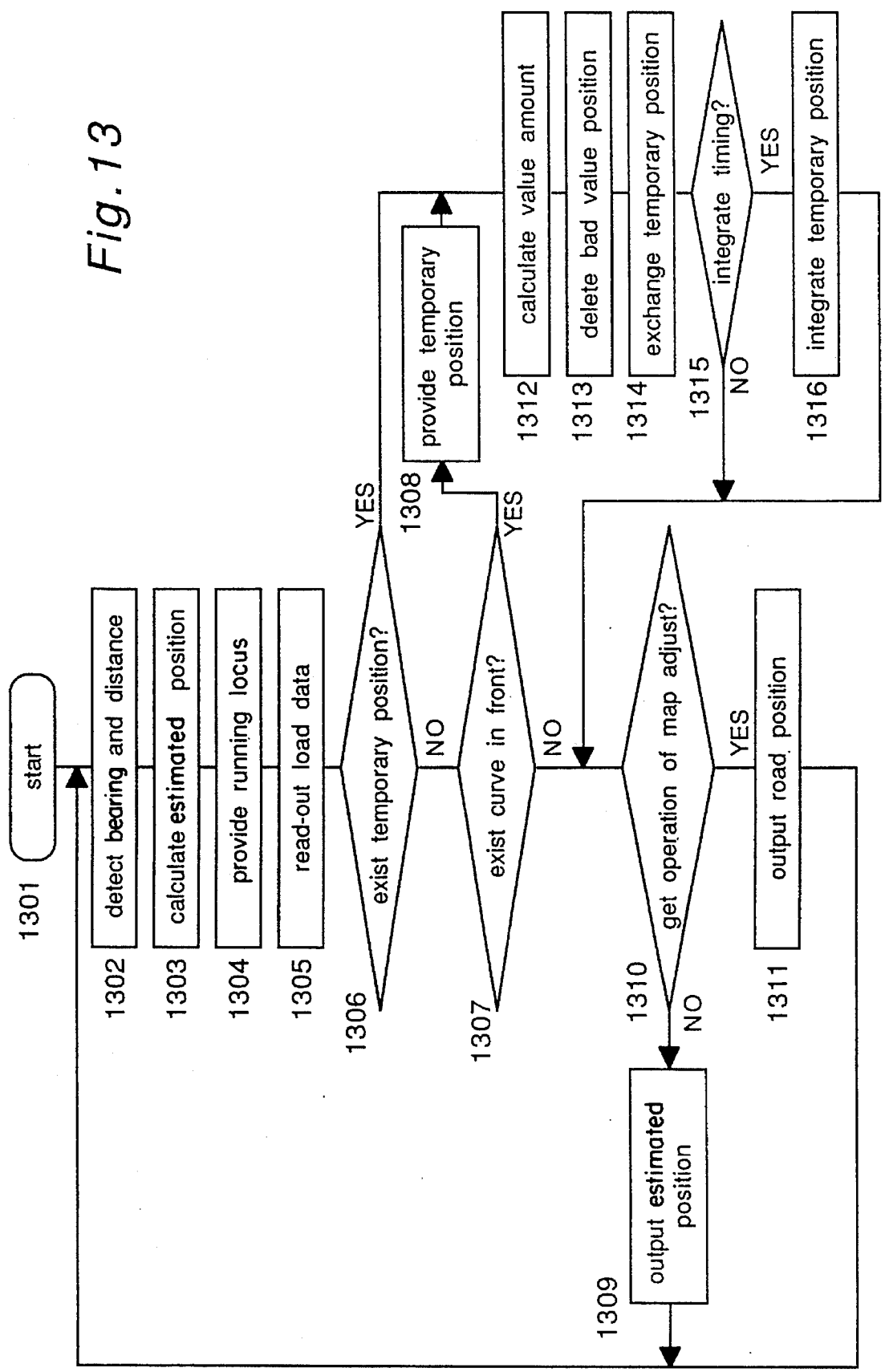
FIG. 13 is a flow chart for illustrating the operations of the vehicle position detecting apparatus in the fourth embodiment.
Figure 14:
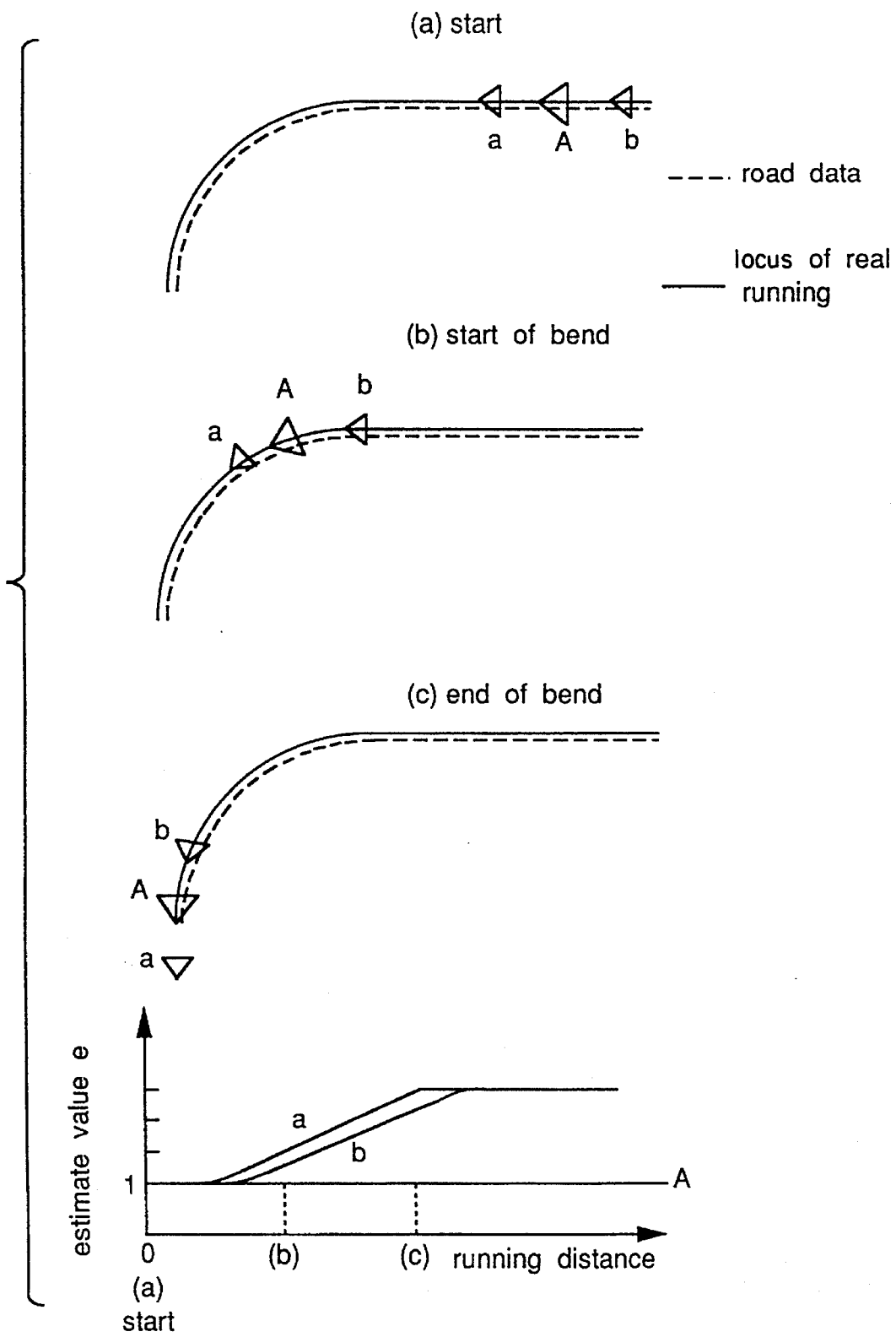
FIG. 14 is a view for illustrating the operations in the fourth embodiment.

FIG. 13 is a flow chart showing the operation of the present embodiment. In FIG. 13, the operation from the step 1301 to the step 1305 is completely the same as in the above described embodiment, with the description thereof being omitted. At the step 1306, it is judged whether or not the temporary position exists. If the temporary position exists, a step advances to the step 1312. When the temporary position does not exist, a step advances to a step 1307. It is judged at a step 1307 whether or not a curve exists ahead. The judgment is effected with the use of the data of the map storing means 104. As the map match computing means 106 reads in advance the road data up to, for example, 50 m ahead, the existence of the curves can be detected in advance. In the present embodiment, it is judged whether or not the curves exist within 50 m ahead. The judgment as to curves is decided by whether or not the bearing of the forward road segment is turned by 60 degrees or more. The value of the turning angle has only to be changed by the accuracy and so on of, for example, the map. When the curve of 60 degrees or more within 50 m ahead at the step 1307 existence, a step advances to a step 1308 so as to make the temporary position. The temporary position will be described hereinafter with the use of the FIG. 14 (*a*). In FIG. 14 (*a*), A is a point where the map matching is effected as the present position, showing the vehicle is approaching curves pretty soon. A point a and a point b existing before and after the a is a temporary position. In the present embodiment, the temporary position is made in a point of 15 m before and after the present point A. The making position of the temporary position also has only to be changed by the accuracy of, for example, of the map. Also, the name of the temporary positions is not restricted to two, may be one or three or more.

Figure 12:
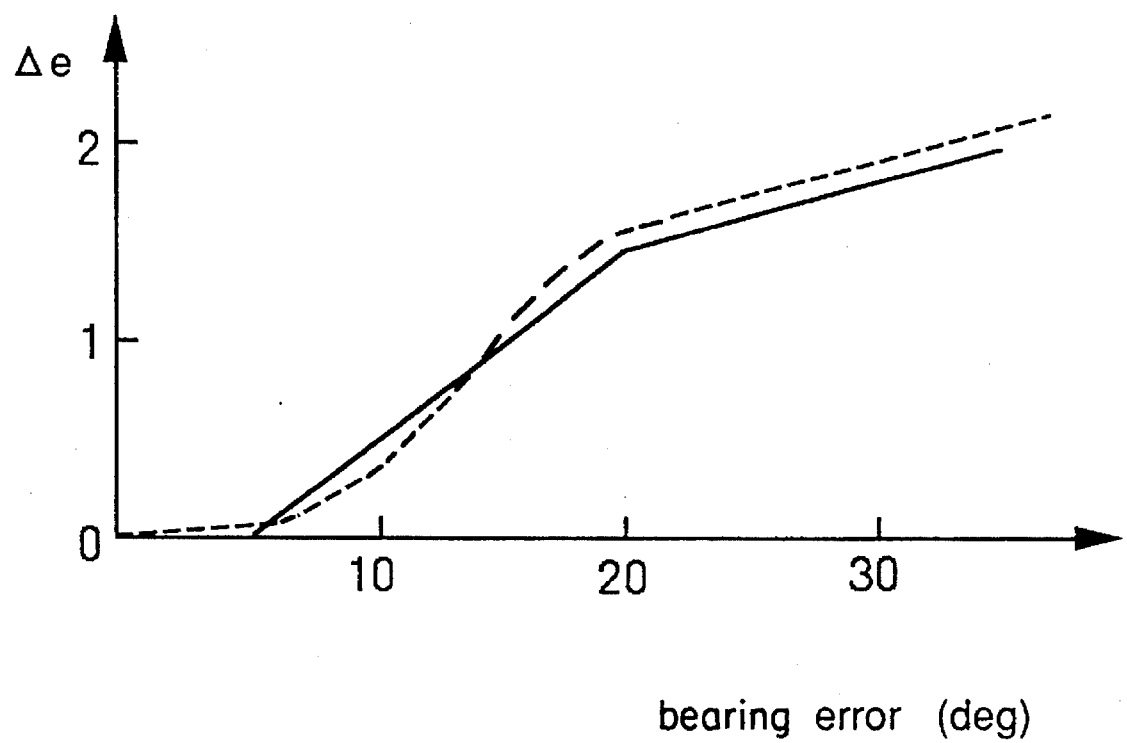
FIG. 12 is a block diagram of a vehicle position detecting apparatus in the fourth embodiment.

When a temporary position is made at a step 1308, the step advances to a step 1312 so as to calculate evaluation values respectively about the made temporary positions a, b and the present position A. The evaluation values show how much deviated it is between the bearing of the point and the bearing by the output of the actual bearing sensor. They are calculated with the use of the correlation function shown in FIG. 12. FIG. 12 is one example of a function for deciding the evaluation value from the bearing error. If the function satisfies the nature shown hereinabove, the other function may be used.

a) to be a monotone increase function;

b) to neglect minute bearing errors;

c) to strengthen the sensitivity near bearing errors actually larger in frequency.

Figure 15:
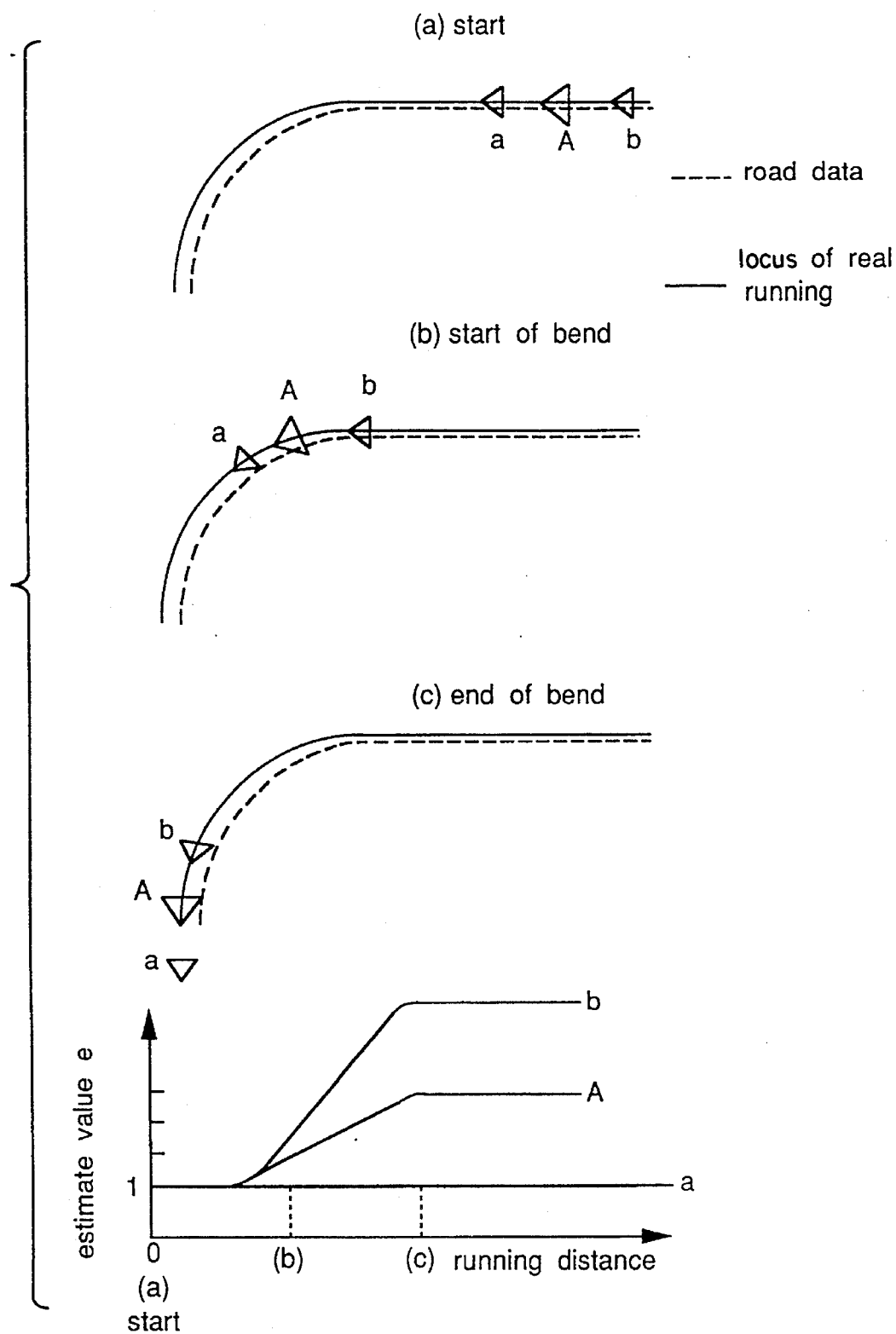
FIG. 15 is a view for illustrating of the operations in the fourth embodiment.
Figure 16:
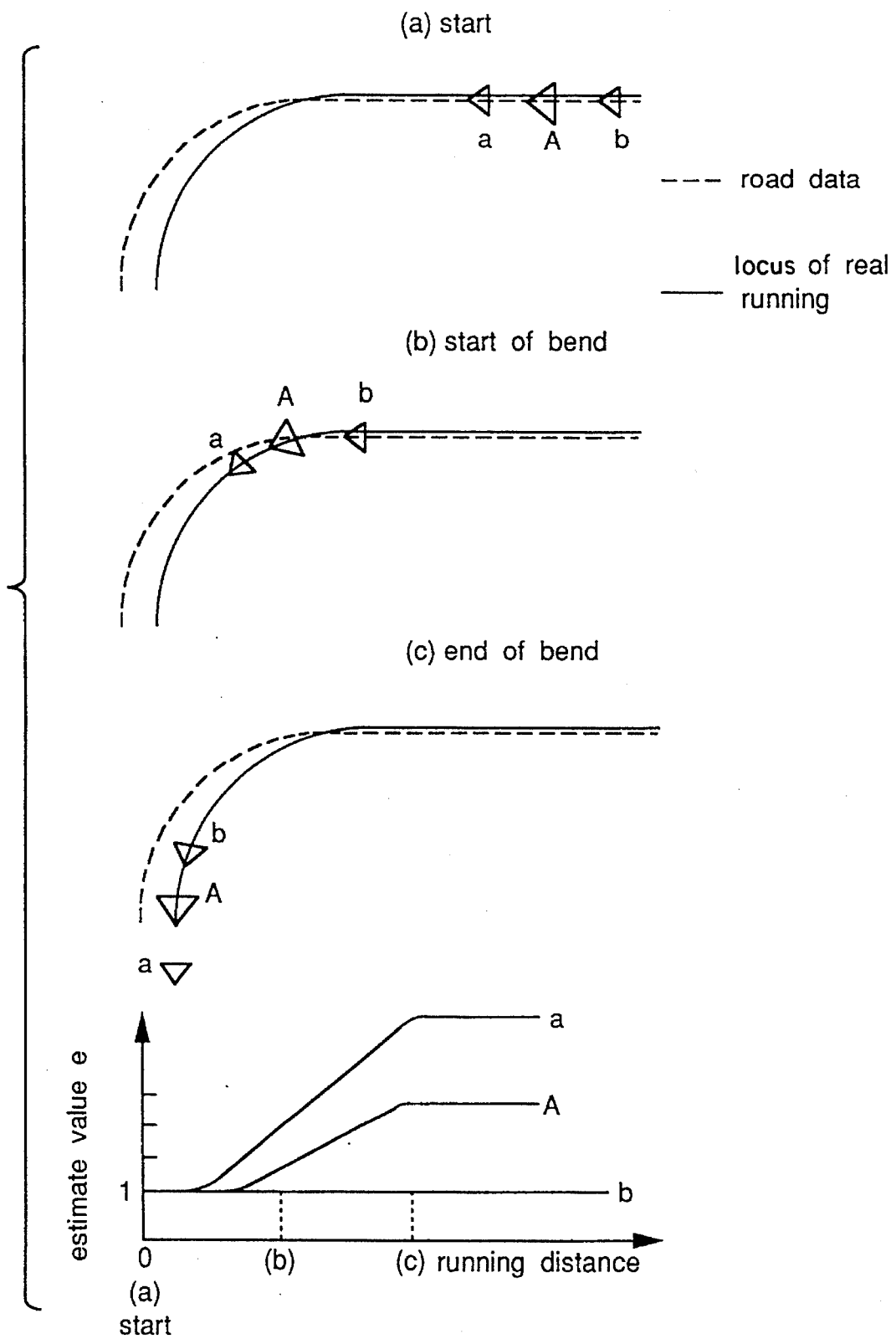
FIG. 16 is a view for illustrating the operations in the fourth embodiment.

The values obtained by functions having the above described natures are integrated into the respective evaluation values. The respective evaluation values can be computed about temporary positions a, b and the present position A. Three evaluation values are normalized. A normalizing method has only to be normalized with a minimum from, for example, the above described three evaluation values (the minimum is assumed to be 1) as the reference. Then, the step advances to a step 1313 so as to remove what is far away (for example, 10 or more) in evaluation value. Then, it advances to a step 1314 so as to renew, as a newly present position, what is closest to the output of the bearing sensor from among the temporary positions a, b and the present position A. Things at the renewal time will be described with reference to FIG. 14, FIG. 15, FIG. 16. In these drawings, a solid line shows road data, wave lines show the actual roads. FIG. 14 shows a case where map data agree with the actual roads. In FIG. 15 and FIG. 16, the map data include the errors, show a case where they are deviated from the actual roads. In the respective drawings, (a) shows a condition where the vehicle is approaching the curve to have caused the temporary position.

(b) shows a condition where the vehicle has started to turn a curve.

(c) shows a condition where the vehicle finished the turning of the curve.

In FIG. 14, when the vehicle approaches a curve, temporary positions a and b before and after the present position A are caused as shown in the (a). The evaluation value e id computed respectively about the present position A and the temporary positions a, b. The things of the changes in the evaluation values with respect to the running distance from the start of the curve are shown in the lowest bottom of the respective drawings of FIG. 14, FIG. 15, FIG. 16. In FIG. 14, the road data with the map storing means 104 being stored in it does not include the fatal errors and are equal to the actual roads. The evaluation value of the present position A is always smaller than of the other temporary position from the approaching to the curve to the escaping finish of the curve. In FIG. 14, the replacement between the temporary position and the present position is not caused. In FIG. 15, the data the map storing means 104 stores include the errors, and are stored as curve larger in diameter than the actual road. When the vehicle has run a curve as in FIG. 15, the bearing the present point A shows is deviated from the bearing the bearing the bearing sensor actually outputs in a stage (condition of b in the drawing) entering to a curve as shown from the graph of the evaluation value. The evaluation value is rising. This is because the road data include the errors. In this case, as the temporary position a is smaller in the evaluation value than the present position a, the temporary position a is replaced as the present position. The same thing can be said even in a case shown in FIG. 16. FIG. 16, as in FIG. 15, the data the map storing means 104 store includes the errors, are stored as curves smaller in diameter than the actual road.

When the vehicle has run a curve similarly in FIG. 16, the temporary position b is smaller in evaluation value than the present position A, so that the replacement of the temporary position is effected to the temporary position b. When the replacement of the temporary position is effected at a step 1314, it is judged whether or not it is a timing for integrating the temporary positions. The integration of the temporary positions will be described hereinafter. In steps 1307, 1308, which have been described before, a temporary position is caused each time a vehicle approaches a curve. When a curve continue like, for example, a mountainous road, temporary positions are drawn up one after another, thus resulting in the number of the temporary positions, finally exceeding the processing performance. Accordingly, temporary positions caused for each running operation are necessary to be removed. The operation necessary for it is an integration. The integration of the temporary positions is adapted to be effected for each 200 m running operation in the present embodiment.

When the timing of the integration is judged at a step 1314, the integration of the temporary positions are effected at a step 1316. A step goes to a step 1310. At a step 1310, it is judged whether or not the map matching operation is performed properly. If it is successful, it advances to a step 1311 so as to output positions on the road the map storing means 104 stores. If the map matching operation is unsuccessful, it moves to a step 1309 so as to output the estimation position computed by the present position estimating means 103 to an outputting means.

Here, a series of operations are over, and advance to a step 1309. The map matching operation is effected with the above described operations being repeated.

As described hereinabove, according to the present embodiment, temporary positions a, b are set in curve. The most suitable one from the temporary positions a, b and the present position A is selected as the present position to renew the present position. The map matching operation in the curve can be effected more correctly without a different feeling.

In the present embodiment, a temporary position is adapted to be caused immediately before the vehicle approaches. The timing for causing the temporary position may be effected after it has actually approached the curve. Also, when the vehicle has escaped from the curve, the temporary position may be caused.

(Embodiment 5)

A fifth embodiment of the present invention will be described hereinafter.

Figure 20:
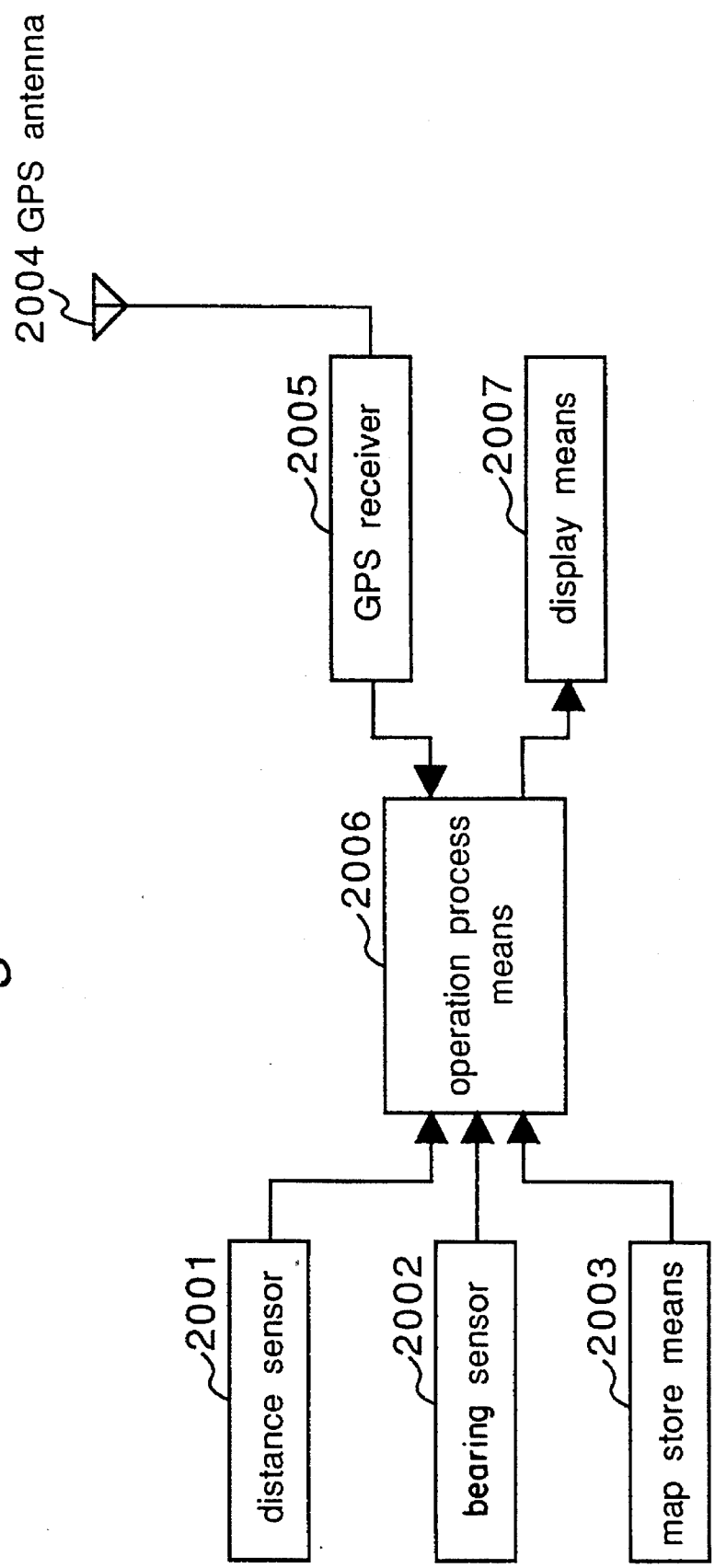
FIG. 20 is a hard construction view in the seventh embodiment from the fifth embodiment.

FIG. 20 shows the basic construction of a vehicle position detecting apparatus common in a fifth embodiment of the present invention. In FIG. 20, a distance sensor 2001 is, for example, a shaft sensor, a wheel speed sensor so as to cause a pulse for each unit distance running operation (for example, each 50 cm). The moving distance is calculated by the multiplication of pulse - distance conversion constant (hereinafter referred to as distance constant) with integration of the pulse number. Reference numeral 2002 is a bearing sensor. It may be an earth magnetic bearing sensor for computing the absolute bearing of the vehicle by the detection of the earth magnetic horizontal component force. Or it may be a rate sensor (optical gyro, gas gyro, oscillation gyro or the like) for obtaining the advancing bearing by the computation of the angle speed of the vehicle to obtain the turning angle from the integration value, to add it to a reference bearing. Reference numeral 2003 is a map storing means. A CD-ROM disk as a storing medium for storing a map data including road information, a CD-ROM player as a driving apparatus are used. Reference numeral 2004 is a GPS antenna, reference numeral 2005 is a GPS receiver. Reference numeral 2006 is a computation processing apparatus. A microcomputer system is provided with a microprocessor, memory, I/O and so on. Reference numeral 2007 is a display apparatus, LCD, CRT and so on are used.

Figure 17:
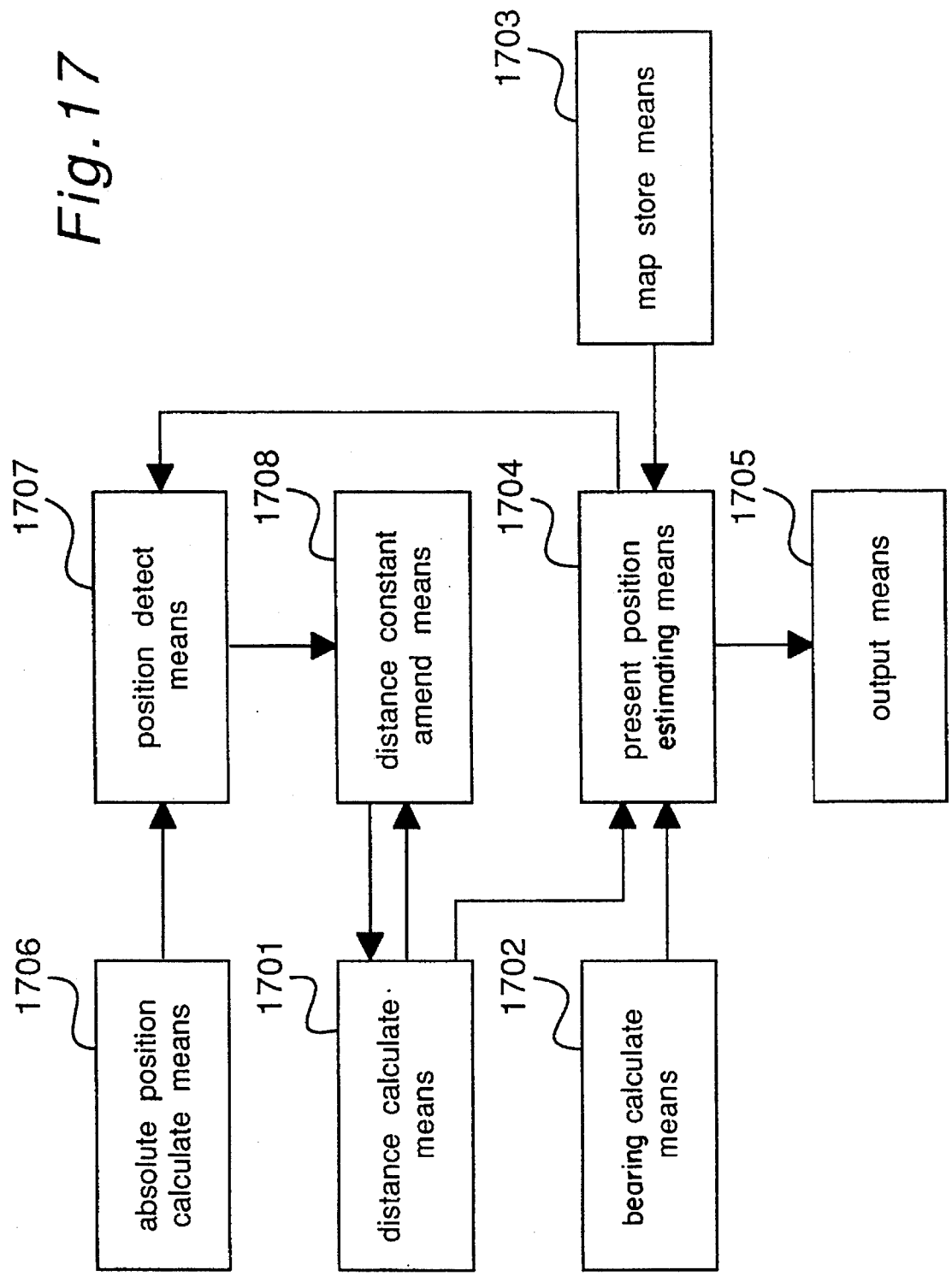
FIG. 17 is a block diagram in a fifth embodiment.

FIG. 17 shows a block diagram of a vehicle position detecting apparatus in a fifth embodiment of the present invention. In FIG. 17, reference numeral 1701 is a distance computing means and is composed of a distance sensor so as to compute the moving distance of the vehicle from the pulse numbers for converting them into the distance information to output them. Reference numeral 1702 is a bearing computing means which is composed of a bearing sensor so as to output the advancing bearing of the vehicle as the bearing information. Reference numeral 1703 is a map storing means, reference numeral is a present position estimating means, a reference numeral 1705 is an outputting means, reference numeral 106 is an absolute position computing means, reference numeral 1707 is a positional detecting means, reference numeral 1708 is a distance constant correcting means.

The vehicle position detecting apparatus of the present embodiment composed as described hereinabove will be described in its operation. Although the present embodiment may be composed with hardware, a case where the present embodiment has been realized with software with the use of the microprocessor will be described. An object of the the present embodiment is to remove as much as possible the influences of the positioning errors in the vehicle position obtained by the absolute position computing means, to detect the vehicle position while correcting the distance conversion constant of the distance sensor with high accuracy.

In the present embodiment, the running locus of the vehicle is obtained from the moving distance-advancing bearing of the vehicle obtained by the distance sensor-bearing sensor with the initially set position as a reference, the present position is estimated from the correlation between the running locus and the map data. The estimating method of the present position is variably devised. For example, the method is shown in, for example, in Japanese Laid-Open Patent Application Tokukaisho No. 61-56910. The position computation is effected with the given distance (for example, each 2 m running). The computed motorcar position is fed to an outputting means. The calculation and the output of the motor car position are carried with priority. In addition, the automatic calibration processing of the distance sensor is also carried out in parallel.

Figure 21:
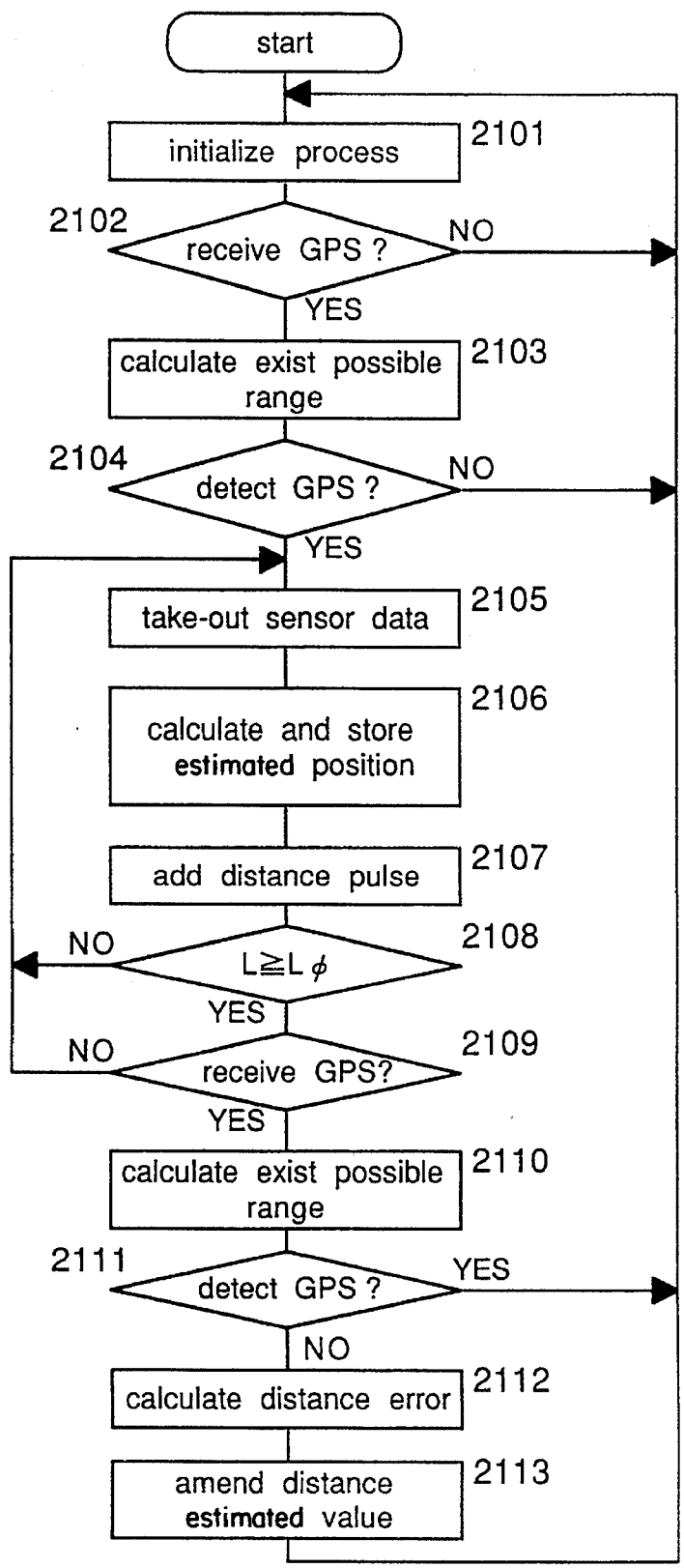
FIG. 21 is a flow chart showing the operations in the fifth embodiment.

FIG. 21 is a flow short showing the automatic calibrating procedure of the distance sensor. At a step 2101, the initial processing of each variable to be used in the automatic calibration is effected. At a step 2102, it is judged whether or not the positioning can be effected by a GPS. When the positioning operation cannot be effected, or when the satellite arrange is interior (PDOP value is large, for example, 3 or more) if the positioning operation can be effected, the step goes back to a step 2101. In a case except for it, it moves to a step 2103 as possible positioning operation. At a step 2103, a possible existence range to be estimated by the GPS positioning is computed. When the positioning performance by the GPS is considered to be 100 m or so with various error factors being integrated when the normal usable C/A code is used. In the present embodiment, a circular region of 100 m in radius with a positioning position being as a center is assumed to be a possible existence range by the GPS positioning. At the next step 2104, it is detected whether or not the estimating position of the vehicle is included in the range obtained at the step 2103. When it is included, the estimating position is made a starting position in the distance calibrating section. When it is not included, it goes back to a step 2101 so as to repeat the processing from the beginning.

At the next step 2105, the data of the bearing sensor-the distance sensor are collected. At a step 2106, the estimating position of the vehicle is computed, stored. At a step 2107, a pulse number L which is equivalent to the moving distance when the estimating position examined at a step 2104 is made a starting point is obtained by the integration. At a step 2108, the comparison between the L and the given value Lo is effected. If L<Lo as a result of the comparison, the processing from the step 2105 is repeated. If the conditions of the L≧Lo are satisfied, it moves to a step 2106. Lo is decided with a calibration accuracy as an object of the distance sensor and the GPS positioning accuracy, here Lo=20 km. In the case of the value, the GPS positioning error radius 100 m assumed at a step 2103 corresponds to an error amount of 0.5%.

If it is confirmed at a step 2108 the a vehicle has run Lo or more in the given distance, the comparison between the latest estimating position of the vehicle and the possible existence by the GPS positioning is effected at a step 2111 from the step 2109. The method is similar to from 2102 to a step 2104. If the GPS positioning can be effected, the processing from the step 2105 is repeated. When the estimating position is included in the possible existence range by the GPS positioning, it is judged that the accuracy of the distance sensor is sufficient in practical use. The step goes back to a step 2101. Only when the estimating position (namely, a terminal point of the distance calibration section) of the vehicle is beyond the GPS positioning range, it is considered that the error exists in the distance constant. It goes to a calibration processing.

Figure 22A:
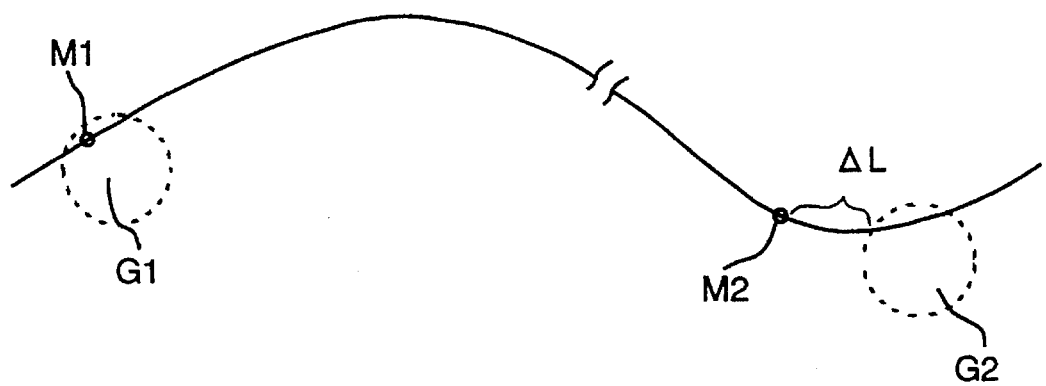
FIGS. 22 (a) and 22 (b) are views for illustrating the operation in the fifth embodiment.
Figure 22B:
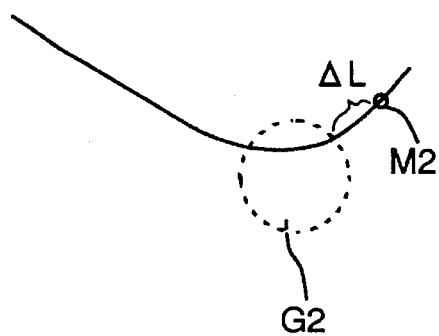

At a step 2112, a computing error by the distance constant used so far is obtained. FIG. 22 is a its illustrating view. In FIG. 22, the M1 is a staring point of a distance calibration section obtained by the present position computing means. It is detected by the possible existence range (G1) with the GPS positioning point being a center. When the distance constant is smaller than the correct value, the a terminal point M2 of the distance calibration section obtained by the present position computing means does not reach the possible existence range (G2) with the GPS positioning point as a center like the (a). When the distance constant is larger, it goes beyond the G2 like the (b). Thus, at a step 2112, the history (namely, locus) of the estimating position obtained at a step 2106 is used so as to examine whether or not a position to be included in the G2 exists within the given distance range (for example, 500 m). When it is included, the distance between the intersecting point of the boundary of the G2 and the running road, and the M2 is assumed to be a distance error $\Delta L$ (<0) like FIG. 6 (b). When it is not included, the distance to the G2 with the M2 as a starting point becomes $\Delta L$ (>0). At a step 513, the distance constant is corrected as follows from the distance L, $\Delta L$ between M1 through M2, and the distance constant Kd.'

$$Kd = Kd' \times (L + \Delta L)/L \qquad (8)$$

If the new distance constant kd is computed at a step 2113, the step goes back to a step 2101 so as to repeat the processing.

According to a fifth embodiment as described hereinabove, a positioning position obtained by the absolute position computing means is used as a region including an error, instead of a point. It is used only for the positional examination of the starting point and a terminal point of the calibration section in the calibration of the distance sensor. It is possible to remove the accumulation of the positioning errors through the comparison with a case where the moving distance of the vehicle is computed directly from the distance between the positioning positions. It is possible to detect the vehicle position while the distance conversion constant of the distance sensor is being calibrated with high accuracy.

Although the GPS was used as an absolute position computing means in the fifth embodiment, a sign post may be used. Although only the conditions of the length were added to the road to be used in the distance calibration, it may remove the influences of the error factors such as the meandering driving of the vehicle-rotation or the like at small rotation radius with addition of conditions of computing the moving speed of the wheel with the use of the distance sensor output, and running at a constant speed or more.

(Embodiment 6)

Figure 18:
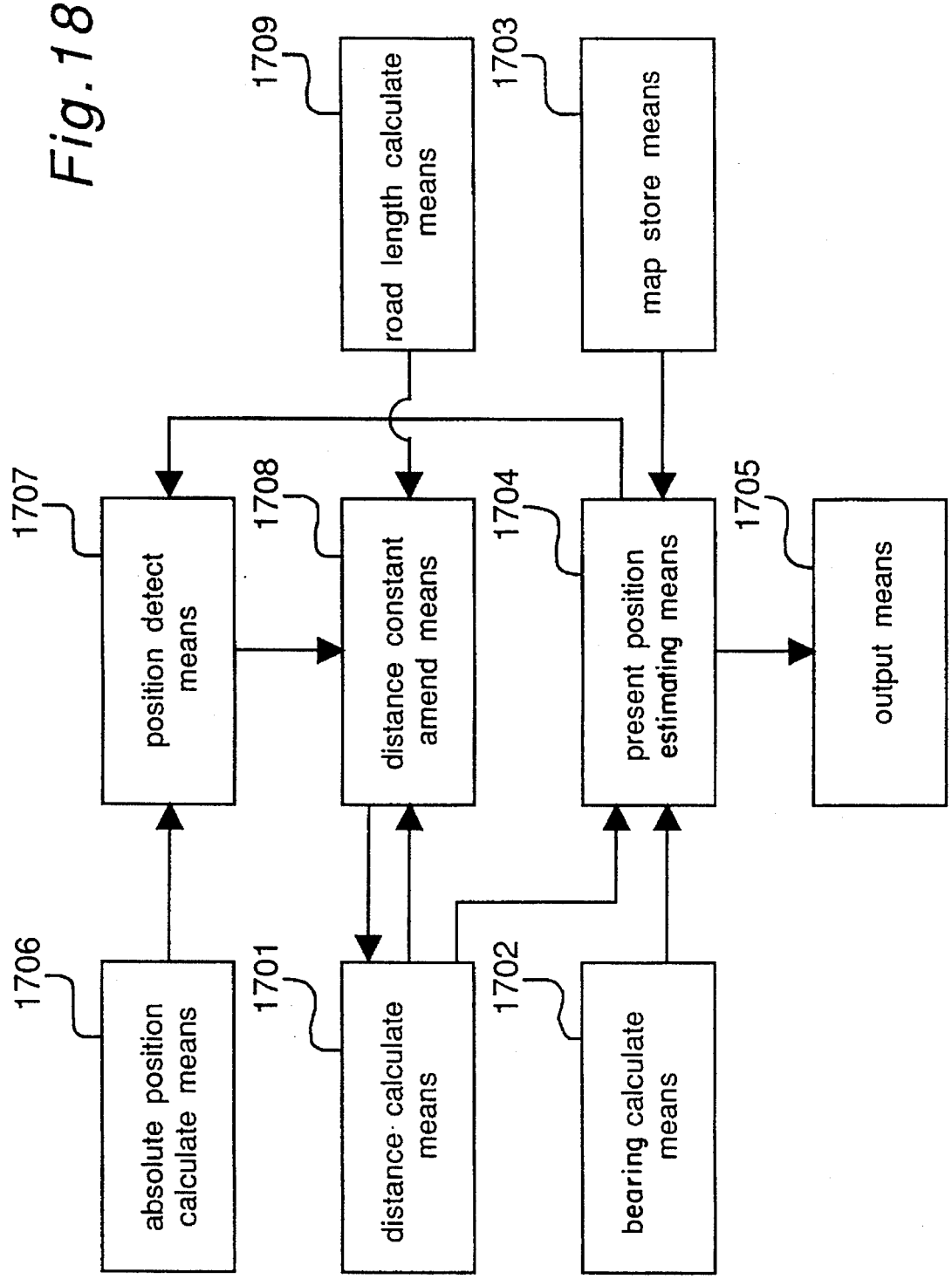
FIG. 18 is a block diagram in a sixth embodiment.

A sixth embodiment of the present invention will be described hereinafter. FIG. 18 shows a block diagram of the present embodiment. As clear from the comparison between FIG. 17 and FIG. 18, all the components to be included in FIG. 17 are included in FIG. 18. The like parts are designated by like reference numerals throughout the accompanying drawings. A road length computing means 1709 is added in addition to it. The vehicle position detecting apparatus of the present embodiment composed as described hereinabove will be described in its operation. A case of the realization by software as in the fifth embodiment will be described even in the present embodiment. An object of the present embodiment is that the moving distance computing error of the vehicle by the output characteristic change of the distance sensor is obtained from the map data with the use of the road length computing means so as to compute the position of the vehicle while the output of the distance sensor is being calibrated with high accuracy.

Figure 23:
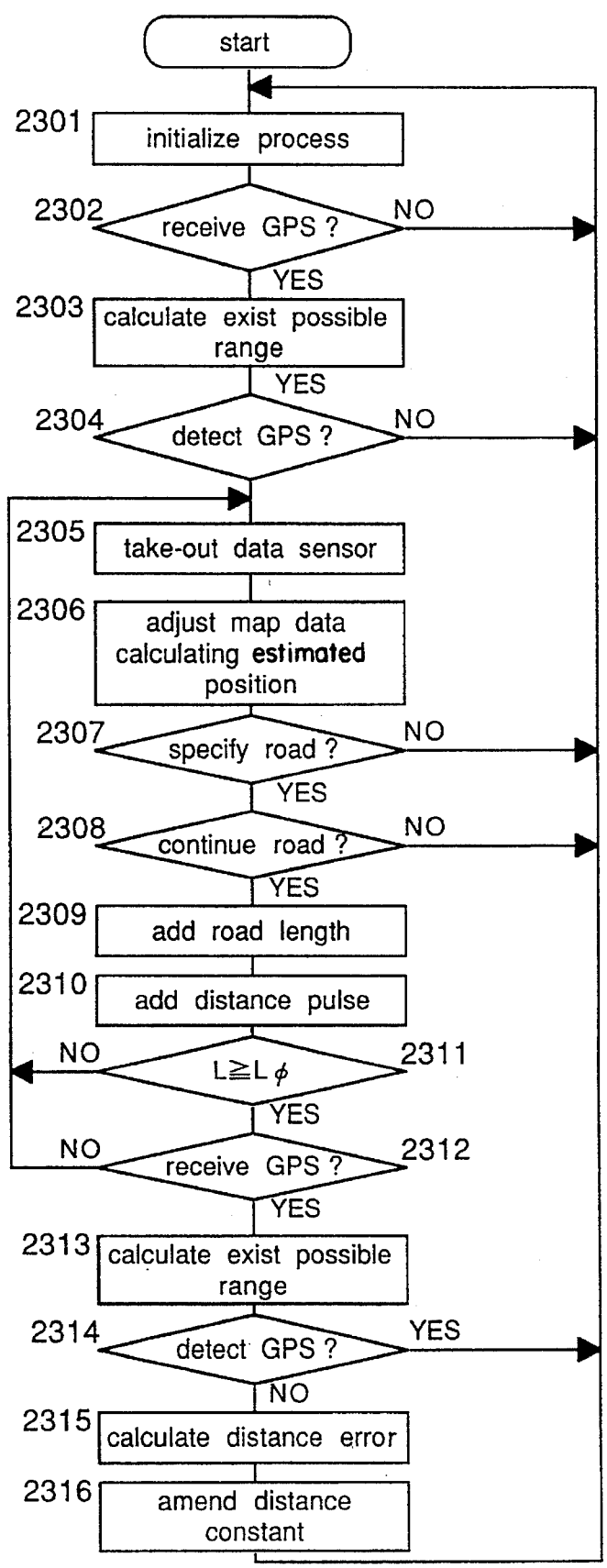
FIG. 23 is a flow chart showing the operations in a sixth embodiment.
Figures 24A, 24B:
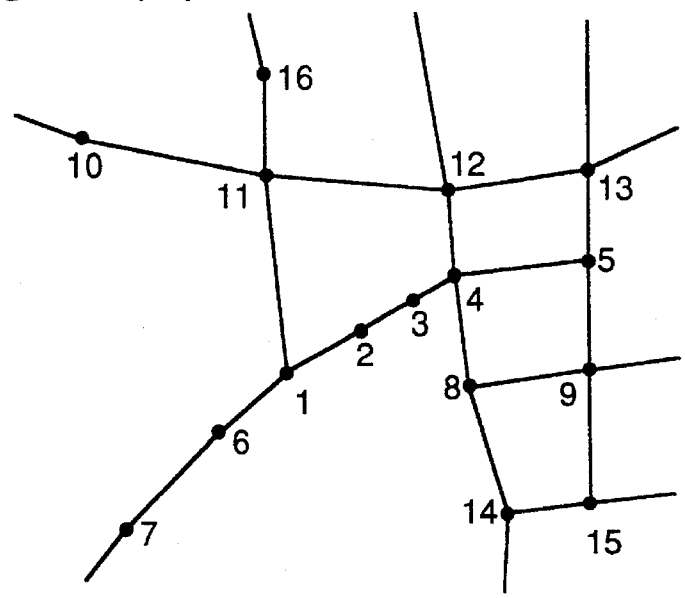
FIGS. 24 (a) and 24 (b) are views for illustrating the operations in the sixth embodiment.

FIG. 23 is a flow chart showing the automatic calibration procedure of the distance sensor. A step 2301 through a step 2305, a step 2310 through a step 2314 are respectively equivalent to a step 2101 of FIG. 21 to a step 2105, a step 2107 through a step 2111 with the moving distance computation of the vehicle, the correcting portion of the distance constant being different from those of the fifth embodiment. In the present embodiment, at a step 2305, sensor data are obtained, and thereafter the estimating position is calculated at a step 2306 so as to effect a matching operation with the map data. If the road can be specified as the result of the matching operation, the step 2307 moves to a step 2308. If it is impossible to be specified, the step goes back to a step 2301. At a step 2308, the continuity of the road is judged. If the newly calculated road is connected with a road immediately before a road, the step moves to a step 2309. If it is not connected with the road, the step goes back to a step 2301. The road length LM from the starting point is computed as an integration valuation of the values obtained from the map data at the step 2309. The description is as follows with the use of FIG. 24. When a road network like FIG. 24 (a), the road is handled as a collection of road segments approximated in straight lines. On the map data, roads are represented as positions of nodal points (for example, latitude·longitude coordinates), connection among the nodal points with nodal points showing intersecting points·road bent points as shown in, for example, FIG. 24 (b) on the map data. If the estimating positions are obtained to specify the road segments, it is possible to calculate the road length (road segment length) as the distance among the nodal points. The connection relation also can be referred to from the map data (also, in addition to it, the information of the road type and so on can be included in the map data).

As the terminal point can be specified up to a step 2314, the distance errors can be obtained at the next step 2315. Although how to obtain the errors is almost the same as in the first embodiment, except for a point that the distance error is computed with the road length obtained from the map data. Up to a step 2315, integration value P of the distance pulse in the distance calibrating section, a road length integration value LM obtained from the map data, a distance computing error (obtained from the road length) $\Delta LM$, so that the distance constant Kd is corrected as follows at the next step 2316.

$$Kd = (LM + \Delta LM)/P \qquad (9)$$

If the new distance constant Kd is computed at a step 2315, the step comes back to a step 2301 so as to repeat the processing.

According to the sixth embodiment as described hereinabove, a positioning position obtained by the absolute position computing means is used as a region including an error, instead of a point. It is used only for the positional examination of the starting point and a terminal point of the calibration section in the calibration of the distance sensor. The moving distance of the vehicle is obtained from the map data with the use of the road length computing means. It is possible to remove the accumulation of the positioning errors at the moving distance computing time of the vehicle. It is possible to detect the vehicle position while the distance conversion constant of the distance sensor is being calibrated with high accuracy.

In order to further improve the computation accuracy of the road length in the sixth embodiment, roads for effecting the distance calibration may be restricted to expressway, toll roads with a road type judging means for judging from the map data the road type of the running road being added.

(Embodiment 7)

Figure 19:
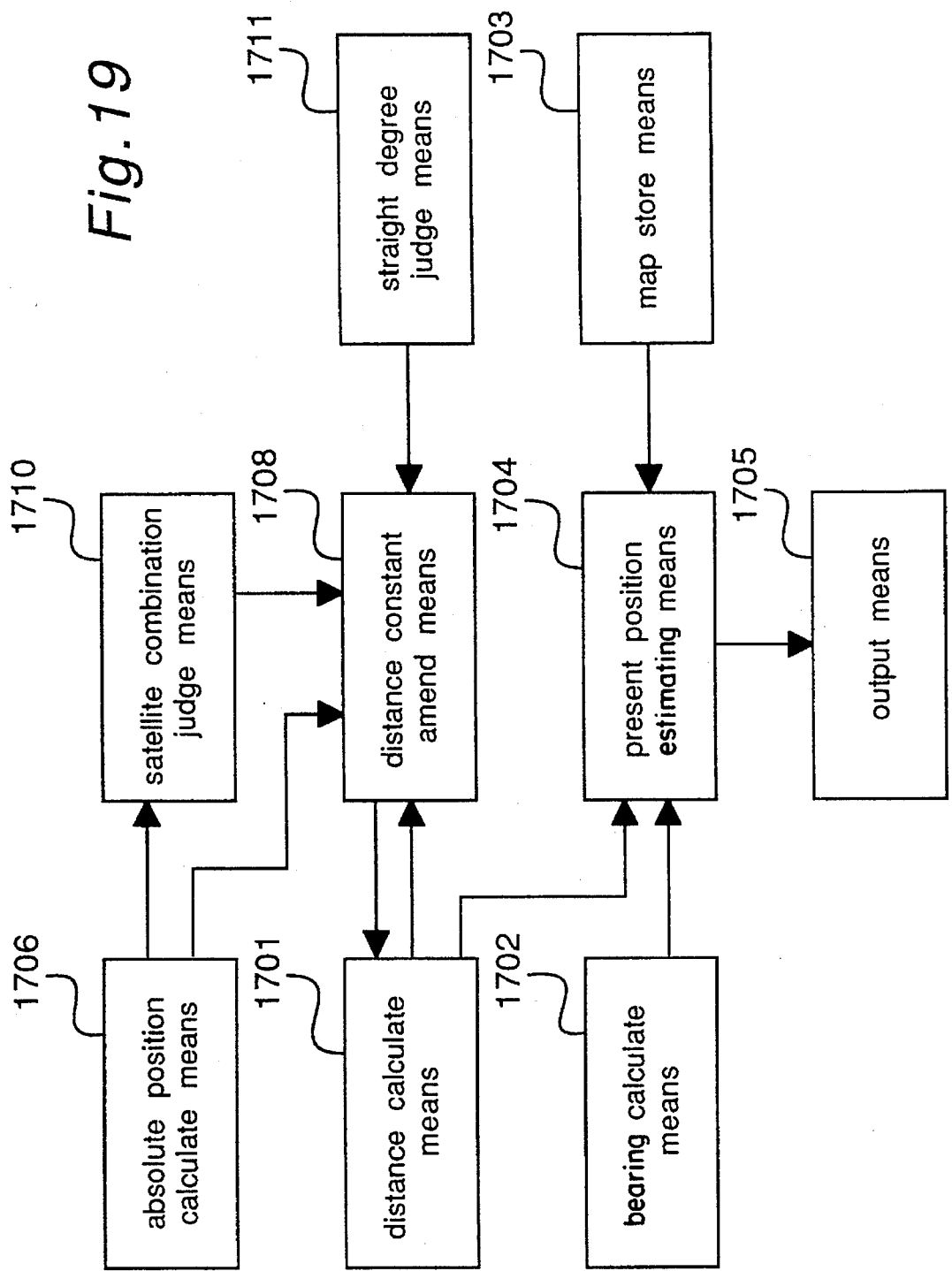
FIG. 19 is a block diagram in a seventh embodiment.

A seventh embodiment of the present invention will be described hereinafter. FIG. 19 shows a block diagram of the present embodiment. As clear from FIG. 17 and FIG. 19, a satellite combination judging means 1710 and a straight advancing judging means 1711, instead of the position examining means 1707 in FIG. 17, are being added.

A vehicle position detecting apparatus in the present embodiment constructed as described hereinabove will be described hereinafter in its operation. A case of the realization by the software as in the fifth embodiment will be described in the present embodiment. An object of the present embodiment is that the moving distance of the vehicle is obtained with high accuracy with the position obtained by the absolute position computing means being adopted or rejected, the position of the vehicle is computed while the output of the distance sensor is being calibrated with high accuracy.

Figure 25:
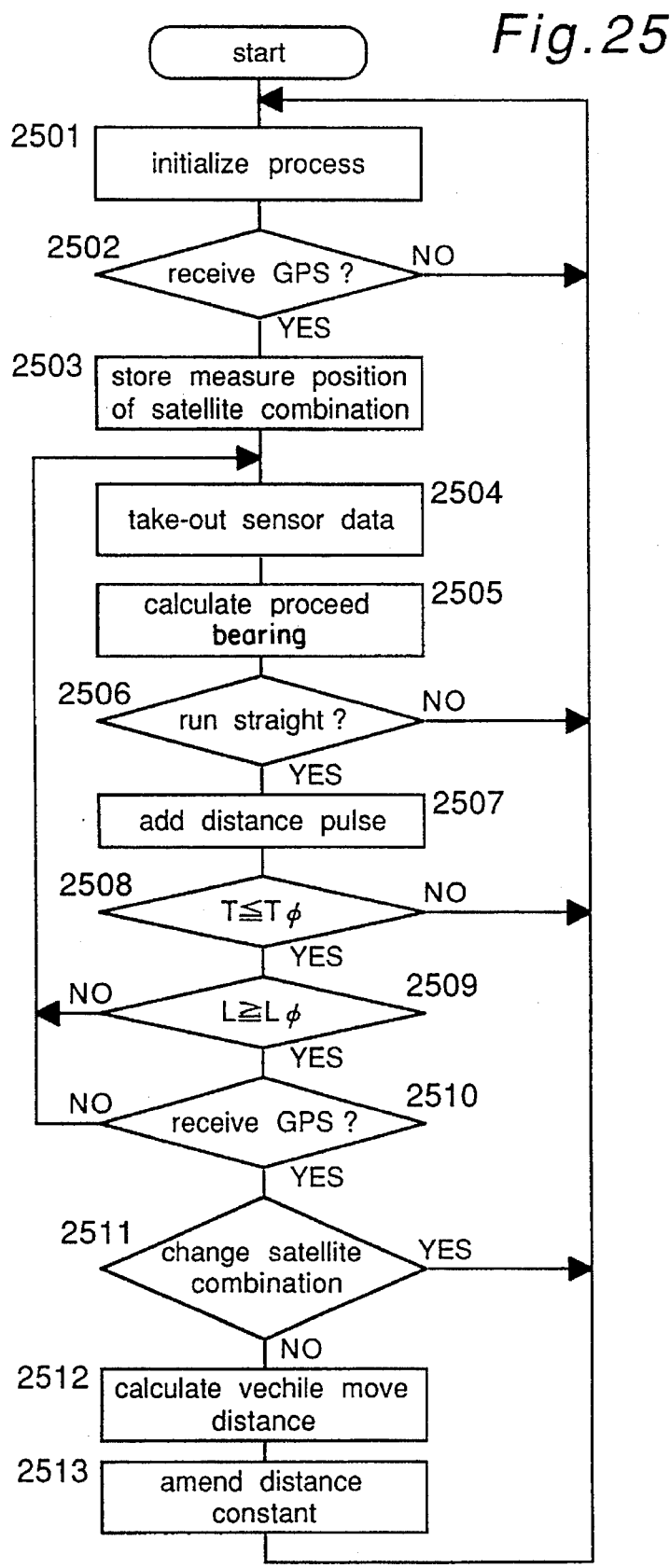
FIG. 25 is a flow chart showing the operations in a seventh embodiment.

FIG. 25 is a flow chart showing an automatic calibration procedure of the distance sensor. Steps 2501, 2502 are similar to steps 2101, 2102 in the fifth embodiment. At the next step 2503, a satellite combination (combination of SV numerals of the GPS satellites) used in the GPS positioning is stored. At a step 2504, the sensor data are obtained. At a step 2505, the computation of the advancing bearing is effected. After the GPS positioning computed here, the advancing bearing of a first vehicle is used as a reference bearing as to whether or not thereafter the vehicle runs at straight advancing operation. At a step 2506, the advancing bearing computed at a step 2505 is compared with a reference bearing so as to judge whether or not the vehicle is straight running. When the vehicle is not straight running, the step moves to a step 2501. When the vehicle is straight running, the step moves to a step 2507 (even at a first time, it moves to a step 2507). At a step 2507, the pulse output of the subsequent distance sensor is integrated (integration value is P) with the GPS positioning point at the step 2503). Steps 2508, 2509 are discarding conditions. When the passing time from the GPD positioning at a step 2502 is longer than a given value To (for example, two minutes), the step goes back to a step 2501. When the moving distance from the starting time is shorter than the given value Lo (for example, 2 km), the step moves to a step 2504.

If the conditions where the passing time from the GPS positioning is within the given time and the moving distance is a given distance or more are satisfied, it is judged whether or not the GPS positioning can be possible to be effected at a step 2510. If it is possible, the step moves to a step 2511. If it is not possible, the step moves to a step 2504. At a step 2511, the combination of the satellites used for the GPS positioning is compared with the combination of the satellites used in the positioning at a step 2511. If the combination of the satellites is not changed, a step moves to a step 2512. If it changes, the step returns to a step 2501. In a step 2512, the moving distance L of the vehicle is computed as a straight line distance between the GPS positioning positions of the step 2502 and the step 2510. At a step 2513, the moving distance L of the vehicle, the distance constant Kd from the pulse integration value between them is corrected as follows.

$$Kd=L/P \qquad (10)$$

If the new distance constant Kd is computed at a step 2513, the step returns to a step 2501 so as to repeat the processing. According to a seventh embodiment as described hereinabove, the vehicle is in a straight advance condition. The moving distance of the vehicle is computed with the use of the position positioned with the combination of the same satellite. In the GPS positioning, error of 100 m or so is caused if the satellite arrangement is good, unless the combination of the satellites to be used in the positioning operation is restricted. If the combination of the satellites is restricted, the relative accuracy of the positioning position is improved by a unit or so. Thus, the positioning error is made unavailable so as to allow the moving distance of the vehicle to be computed. The vehicle position can be detected while the distance conversion constant of the distance sensor is being calibrated with high accuracy.

In a seventh embodiment, the bearing sensor output was used in the judgment of the straight advance of the vehicle. The straight advance may be judged from the dispersion of locus of the GPS positioning position. Also, the judgment may be effected with the use of the other turning angle sensor like a steering sensor. In the present embodiment, the combination of the satellites is made constant in conditions. More relative positioning error may be reduced with conditions being added so that the positioning may be effected continuously and the combination of the satellites is constant.

As described hereinabove, in the present invention, the error amount of the road data is estimated, the error amount of the road data is estimated by the map range selecting means for extracting the evaluation range from a portion less in error amount. The correct positional detection can be effected without influences by the error of the road data for pattern matching operation with the locus with the use of the evaluation range selected from the portion less in the error amount.

The bearing of the bearing sensor from the bearing of the road data with the Use of the road data small in the selected error amount by the bearing correcting means for correcting the bearing of the bearing sensor from the result of the pattern matching in the data before and after the passing of the curve, so that correct bearing correction can be effected, thus improving the positional detection accuracy.

By the bent road judging means for changing the tolerance amount of the error of the map matching by the detection of the running of the bent road and so on large especially large in the error of the road data, the drawing in to the road of the map matching is strengthened by the detection of the mountainous road and the bent road which become especially large in the errors in the road data, and becomes large in the errors of the sensor data because of the road slope, so that the correct positional detection can be effected.

In the map matching in the curve, the temporary position is caused, and replacement is effected between the temporary position and the present position. Even when the errors are included in the road data, the correct positional detection without a different feeling can be effected.

The distance conversion constant of the distance sensor output which changes due to causes such as air pressure changes of the tire during the running operation of the vehicle is automatically calibrated with the use of the absolute position computing means of GPS and so on, the output of the distance sensor can be maintained, and the positional detection accuracy of the vehicle can be improved.

(Embodiment 8)

Figure 28:
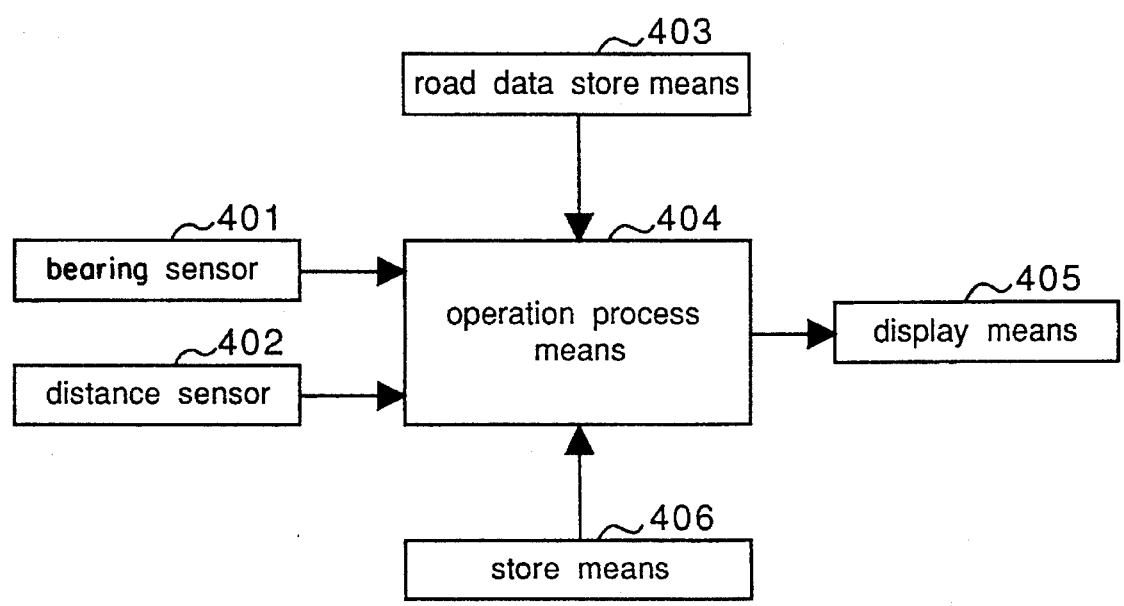
FIG. 28 is a construction view of a vehicle position detecting apparatus to be applied to an embodiment of the present invention.

FIG. 28 is a hard construction view of a vehicle position detecting apparatus to be applied to the eighth embodiment and a ninth embodiment of the present invention. Reference numeral 401 is a bearing sensor of high accuracy. In the present embodiment, optical fiber gyro (hereinafter referred to as to optical gyro) is used. In addition, such an oscillation rate gyro, gas rate gyro and so on can be used. Reference numeral 402 is a distance sensor so as to output pulse signals of a number corresponding to the rotation of the tire. Reference numeral 403 is a road data storing apparatus, where, for example, a CD-ROM disk with road data being stored in it, and a CD-ROM player for reading it are used. Reference numeral 404 is a computing processing apparatus, which is a microcomputer provided with an I/O for loading the sensor data and the road data. Reference 406 is a storing apparatus such as a semiconductor memory to be used for storing the non-matching region to be described later. Reference numeral 405 is a display apparatus such as a display or the like.

Figure 26:
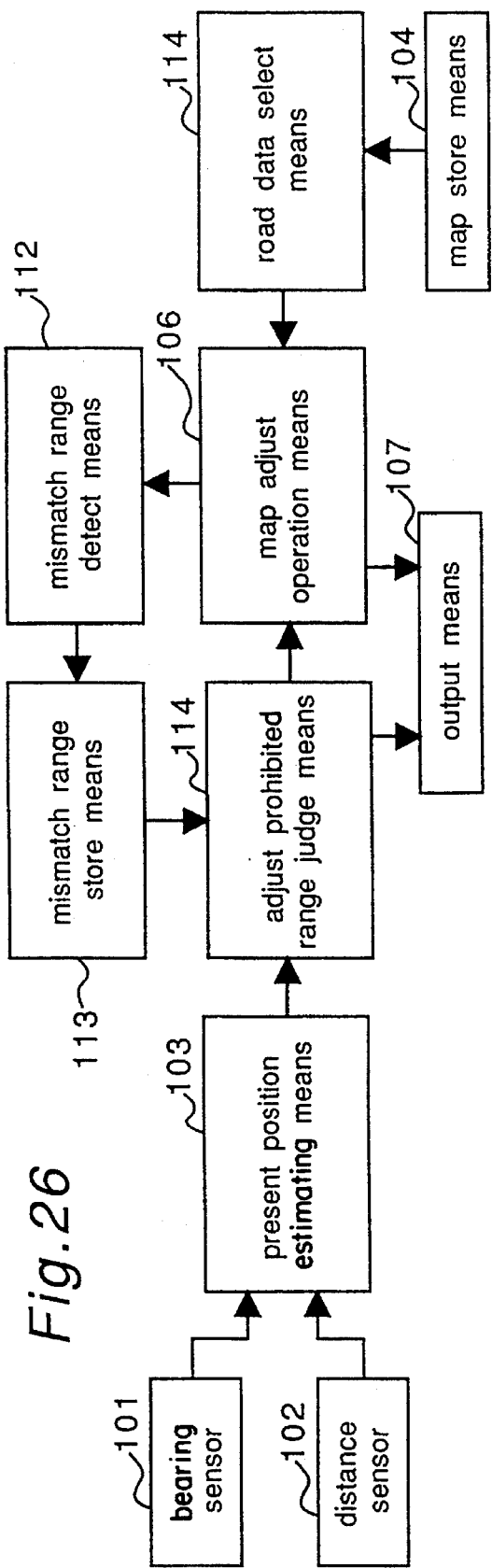
FIG. 26 is a block diagram of a vehicle position detecting apparatus in an eighth embodiment of the present invention.

FIG. 26 is a block diagram of a vehicle position detecting apparatus to be applied to the first embodiment of the present invention.

In FIG. 26, reference numeral 101 is a bearing sensor of high accuracy. In the present embodiment, an optical gyro is used. Reference numeral 102 is a distance sensor. A vehicle speed sensor and a vehicle speed sensor are sued. Reference numeral 103 is a present position estimating means. From the bearing sensor and the distance sensor, the computation of the present position and the computation of the running-locus vehicle are effected with respect to the reference position. Reference numeral 104 is a map storing means. The road data described in the map are stored. Reference numeral 114 is a road data selecting means for selecting the road data to be used for the map match computing operation. Reference numeral 106 is a map match computing means. The pattern matching is effected from the present position of the vehicle computed by the present position estimating means 103, a running locus to be made by the present position from the past, and a road data obtained by the road data selecting means 114 so as to correct the present position of the vehicle on the road. Reference numeral 112 is a non-matching region detecting means. At the map match computing time, a region where the matching of the road data and the running locus is bad is detected and is stored by the non-matching region storing means of reference numeral 113. Reference numeral 114 is a match prohibiting region judging means. It is judged whether or not the map match computing is effected by the judgement as to whether or not the present position is effected within the non-matching region. Reference numeral 107 is an outputting means for displaying on a display mounted on the vehicle the present position of the vehicle computed by the present position estimating means 103 or a map matching computing means 106.

The vehicle position detecting apparatus of the eighth embodiment composed as described hereinabove will be described hereinafter in its operation. The present invention can be realized even with a hardware, but in the present embodiment, a case where the processing by the software with the microcomputer or the like will be described. In the eighth embodiment, an object is to automatically judge the region where errors exist in the road data at the map match computing operation, to prohibit the map matching operation at a region at the running time at the next time and its subsequent, and to effect the positional detection of high accuracy independently of influences upon the errors of the road data.

Normally, the error of the road data is partial. When the bearing sensor of high accuracy such as optical gyro or the like is used, the running locus of the vehicle can be detected very correctly so that the errors of the partial road data can be detected. In order to detect the errors of the road data positively, it is necessary to confirm whether or not the locus and the road data conform in shape with each other before and after a portion where the error exists. A portion where errors exist at the map matching computing time is detected, and the position is stored. By the prohibition of the map match computation in the passing through the same region again, the processing for preventing the error correction where the errors of the road data exist becomes necessary.

Figure 29:
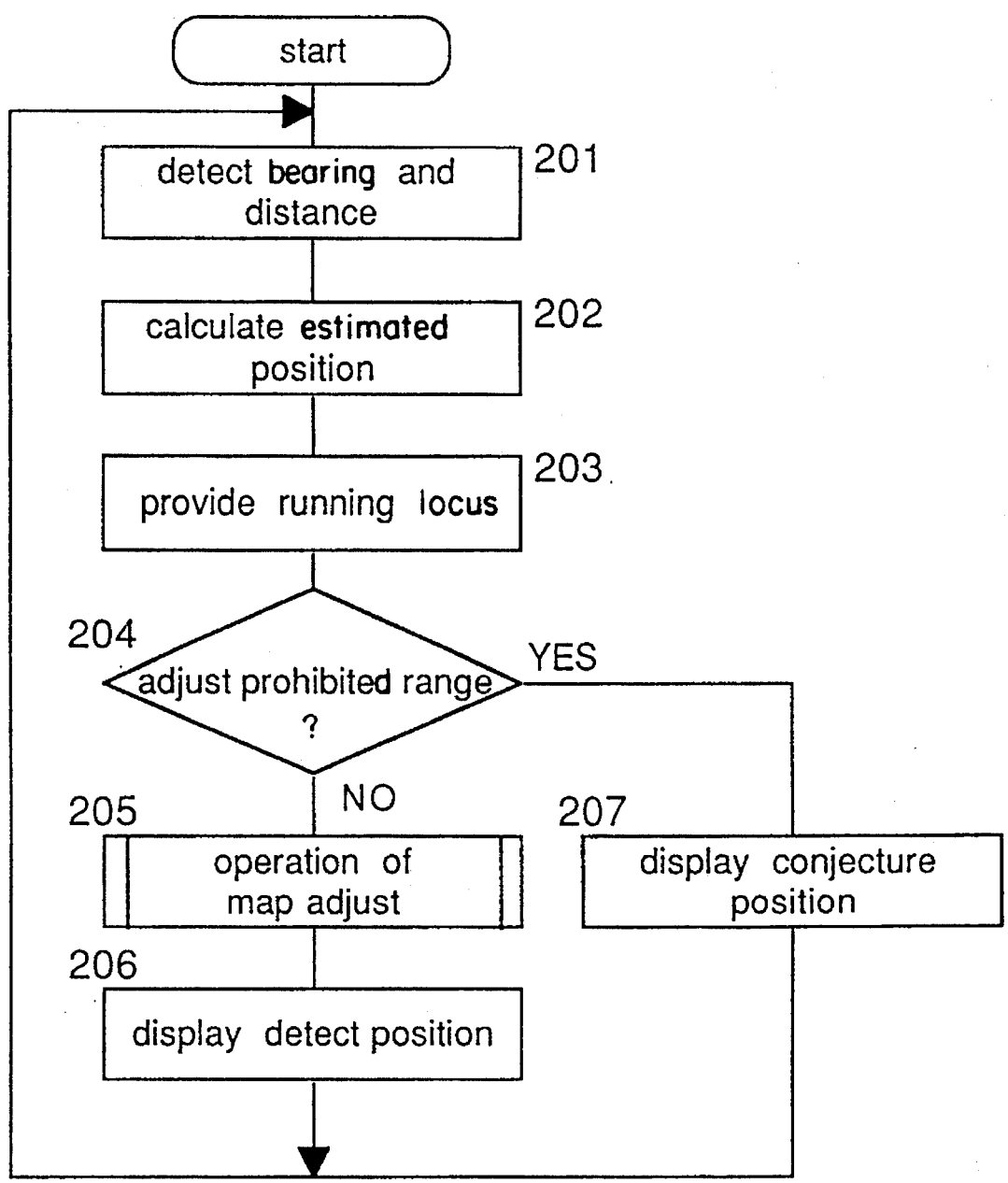
FIG. 29 is a flow chart for illustrating the operations in the eighth embodiment of the present invention.

FIG. 29 is a flow chart showing a procedure of a positional detection in the eighth embodiment. The operation will be described in accordance with it. At the appliance setting time, the setting of the initial position is necessary. The coordinates of the position of the vehicle are inputted manually or are set by the external information of the electric wave navigation and so on. When they are once set, they are not necessary reset by the storing of the position where the vehicle has stopped previously. Thus, the setting of the initial position is useless. The same thing can be said even when the sensor for detecting the turning angle of the vehicle such as optical gyro, oscillation rate gyro or the like is used for the bearing sensor. Once the manual setting or the bearing setting by the external information are effected, it is normally useless to-set the absolute bearing.

At a step 201, the advancing bearing of the vehicle and the running distance there are detected each time the vehicle runs for unit distance (for example, 5 m). When an optical gyro is used for bearing sensor, the advancing bearing D is defined in the formula (1).

$$D=D'+Ta \qquad (1)$$

where D' is an absolute bearing to be obtained up to the previous time. Ta a is a turning angle detected by the optical gyro during the unit distance running operation.

At the next step 202, the estimating position of the vehicle is computed by the following formula (2) and (3) with the estimating position of the vehicle to be obtained up to the previous time being provided as a reference position.

$$X=X'+L\cos D \qquad (2)$$

$$Y=Y'+L\sin D \qquad (3)$$

wherein X, Y are estimating position coordinates of a vehicle, X', Y' are estimating position coordinates of the vehicle at last time, L is a section running distance, D is an advancing bearing.

At a step 403, the estimating position coordinates are sequentially stored so as to make the running locus by the completion of the respective coordinate intervals with straight liens. At a step 204, it is judged whether or not the estimating position computed at a step 204 is provided within a match prohibition region to be described later. If the estimating position is within the match prohibiting region, the estimating position computed at a step 202 is displayed at a step 207 so as to complete the processing. If the estimating position is outside of the match prohibition region, the position is detected by the match match computing operation at a step 405 so as to display the detection position at a step 206 for completing one processing.

Figure 30:
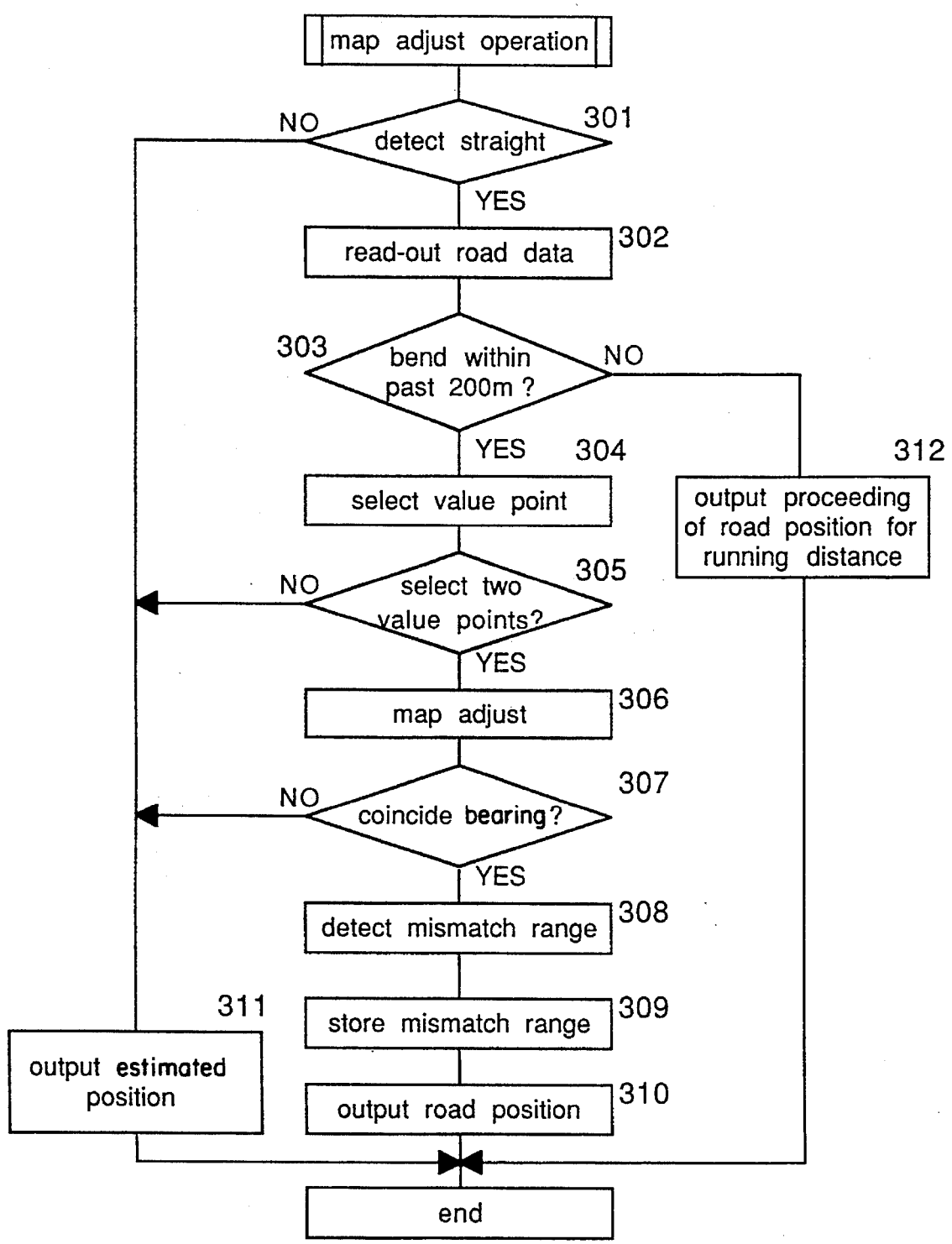
FIG. 30 is a flow chart for illustrating the operations of the map match computation in the eighth embodiment of the present invention.

FIG. 30 is a flow chart showing a procedure of a map match computing operation in the eighth embodiment. The operation of the map match computing operation will be described in detail. As the road data are generally approximated in straight line in the shape of the road, the straight line of the road is generally higher in accuracy than the bent portion. The straight advance portion is necessary in the running locus for matching with the road data. At a step 301, it is judged whether or not the vehicle is in the straight advance condition. The variation angle 5° or lower in the advancing bearing in, for example, 50 m section is assumed to be in a straight advance condition. When the vehicle is in the straight advance condition, the step advances to the processing at a step 302 and its subsequent. When the vehicle is not in the straight advance condition, the estimating position of the vehicle is displayed at a step 311 to complete one processing. At a step 302, the road data to be used by the map match computing means are loaded. The road data exists within La (for example, 50 m) from the estimating position of the vehicle, they are closest to the estimating position. The La may be enlarged, contracted in accordance with the running distance of the vehicle, the running time, the bent angle.

By the map match computing means, the correlation between the running locus and the road data is computed when one winding or more exist between two straight advance portions so as to chiefly set the position on the road. As the present position on the road is advanced when the vehicle is simply straight running. It is judged whether or not a winding exists between a past constant distance (for example, 200 m) at a step 303. It judged whether or not the varying angle of the advancing bearing in the section is 10° or lower. When the road is bent, the step moves to a step 304. When the road is not bent, the present position on the road during the present running operation is moved by running distance portion at a step 312 so as to output the position to complete the processing.

In the present embodiment, the map match computing operation is effected with the use of points on the road data. At a step 304, the map evaluation point is selected from the map evaluation range in a portion less in the errors of the road data. The error of the road data will be described hereinafter.

In a case of Japan, the road data are based on a topographical map or the like issued by Land Geography company of Kokudo-chiliin in Japan.

The shape of the road described in the map is approximated in the straight lines, is stored in the map storing medium of CD-ROM or the like with each straight line being expressed in the shape of the vectors.

The vectors are segments in the storing system. The starting point and the terminal point of the vector are stored as various methods. Either of them is the same in that the roads being approximated in straight lines. The straight line approximation may be made closer to the correct shape if the approximation is made with very short straight lines. As the data amount is increased, the data amount and the accuracy are compromised with practical lines. The road data and the road shape become large in shape near intersection points (see FIG. 7 (a)). At a step 304, the road data for satisfying the following two conditions are judged to be small in error amount. One road vector data are called road segments.

1) The length of road segments is longer than Ld (for example, 100 m)

2) The difference between the direction of the road segments as an object and the direction of the road segments for connecting before and after it is smaller than the given value (for example, 20°).

As the coordinates-bearing accuracy of the intermediate point of the segments even in the road segments is considered as highest, the intermediate point of the road segments for filling the above described conditions is a map evaluation point. Then, at a step, it is judged whether or not the map evaluation point of two points are obtained before and after the winding. When obtained, the match computation of the map and the locus is effected at a step 306. When the evaluation point is not obtained, the estimating position is outputted to complete the processing at a step 511.

The match computing method at a step 306 will be described hereinafter with reference to FIG. 7. FIG. 7 (a) is one example of road data, and segments for connecting a dot with a dot are road segments already provided. The running locus when the vehicle has run from A to F on such road data is shown with broken lines of FIG. 7 (b) (S1, S2 are straight advancing portions before and after the winding). One dot chain line of FIG. 7 (b) shows the actual shape of the road shown in FIG. 6 (a). In order to make the road data from the central line of the actual road, the road errors become larger. The error between C–D of FIG. 7 (a) is a typical example of the error of the road data near the intersecting point. The map evaluation point obtained at a step 504 become M1 and M2, with the bearing at the M1 becoming θ. One point in the straight advance portion S1 before the winding of the running locus is conformed to the coordinate of the M1. When the error of the advancing bearing is larger, the running locus is conformed to the M1 and at the same time, the locus has only to be rotated so that bearing at a point where it is conformed to the M1 may become θ. Thus, the absolute coordinate of each position of the running locus can be decided. Then, the shortest distance d between the M2 and the locus is obtained (FIG. 7 (d)). A point of the straight advancing portion S1 for conforming it to the M1 is shifted by the given distance (for example, 10 m) within the given range SA (for example, 200 m) so as to obtain the d again. When the minimum d is given, the ordinate of the M1 is given to the M1 to a point where it is conformed to the M1 so as to decide the coordinate the tip end of the running locus, namely, the present position.

At a step 307, the bearing at the M2 is compared with the bearing of the running locus which is away by d from the M2. When the difference of the bearing is Da (for example, 10°) or more, the estimating position is outputted at a step 311 so as to complete the processing.

Figure 31A:
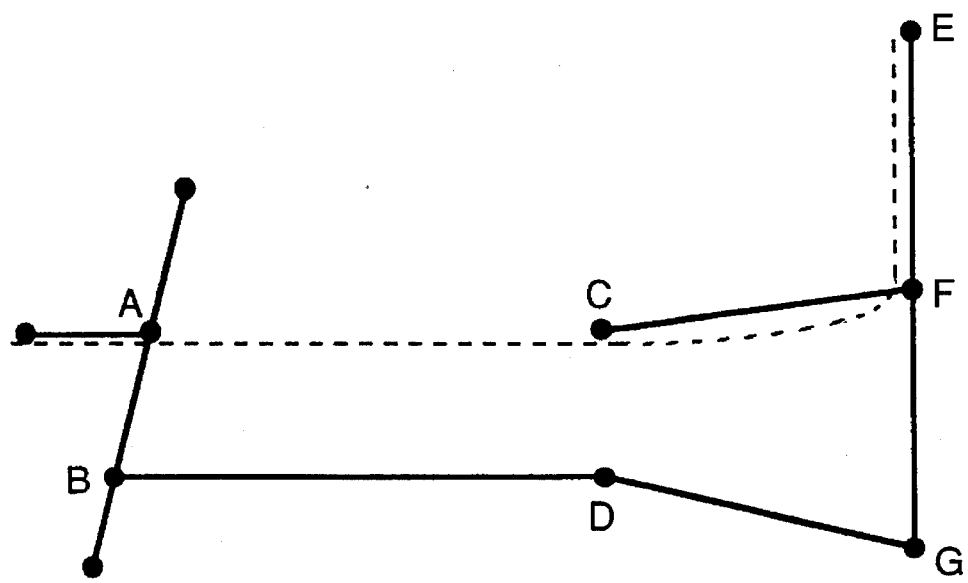
FIGS. 31 (a) to 31 (b) are views for illustrating the eighth embodiment.
Figure 31B:
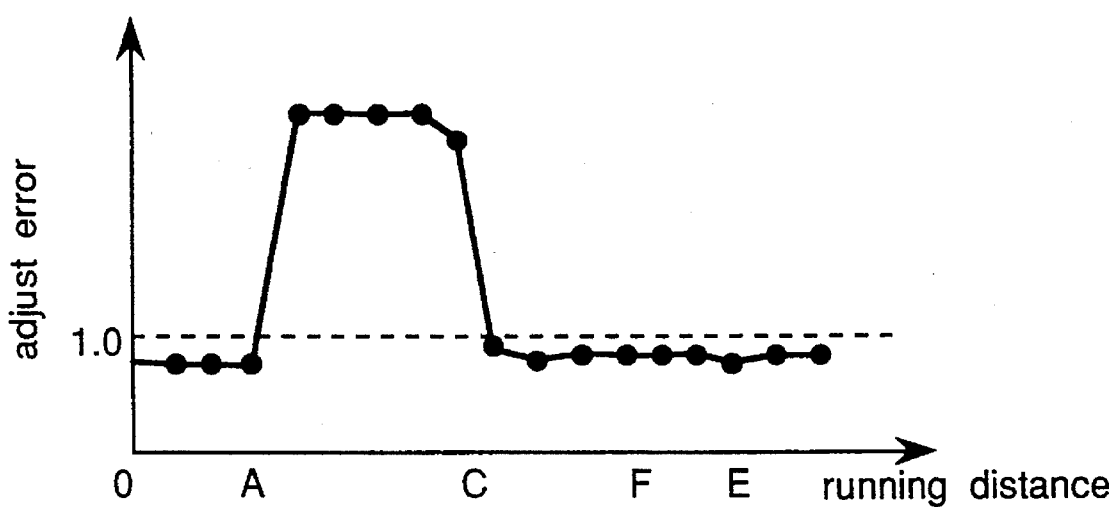

When the difference of the bearing is the given value or lower, the detection of the non-matching region of the running locus and the road data used for the map match computing operation is also effected. The detection method of the non-matching region will be described in detail with reference to FIG. 31. In FIG. 31 (a), the road data of the region is described in solid line so as to describe with broken lines the locus when the vehicle has actually run A→C→F→E. Assume that a road exists between AC although a road between the AC is not described in the road data. When the distance between the AC is long, the present position may be detected by mistake on the road between BD. The position detection accuracy is lowered by the error (want between the AC) of the road data. When a vehicle passes such point for the first time in the present invention, the present position is detected by mistake in the road between BD. The non-matching region is detected between the AC, is stored when the present position has been reached between CF so as to prevent the present position from being detected by mistake on the road between the BD when the vehicle has passed on the same point at the next time and its subsequent.

The matching error SE of the running locus and the road data can be computed as follows.

$$SE = dist \times derr \times fd \qquad (11)$$

wherein dist: the shortest distance from a point on the locus to the road derr: the bearing difference at a locus for giving the shortest distance and a point on the road
fd: coefficient The fd is a coefficient for normalizing to 1.0 or so the match error SE of the running locus and the road data when the correct road is kept detected. It may be a constant, a variable to be decided by the dist, derr. FIG. 31 shows a graph whose axis of abscissas is running distance, whose axis of ordinates is SE, with the SE being computed about each point set at a constant interval on the running locus. The SE becomes larger between AC where errors exist in the road data. The region is judged to be non-matching region when a section where the SE becomes a given value (changes by fd, but 1.0 in the example) or more continues for a given distance (for example, 50 m) or more. In this example of running to a point E point, the AC interval is judged to be a non-matching region. When the vehicle runs between AC, the match error SE becomes larger, but the non-matching region is not confirmed as it is within the non-matching region. When it passes the non-matching region and the matching error has become small again, the non-matching region is confirmed and detected.

At a step 309, the non-matching region detected in the above described processing is assumed to be a match prohibiting region and is stored in a semiconductor memory or the like. The stored match prohibiting region is used for comparison with the estimating position at a step 204 of FIG. 29.

Finally, a vertical line is lowered to the road segment from the tip end of the running locus at a step 310, with its foot being detected as a present position so as to output it as a position on the road. The outputted position is displayed as a detecting position obtained by the map match computation at a step 206 in FIG. 29.

According to the present embodiment as described hereinabove, when a portion large in the error of the road data is once detected in the map match computation, subsequently the prohibition of the match computation at the region prevents the present position from being detected on the road large in the error, so that the detection of the stable present position can be effected. Accordingly, on the road of high in using frequency, the position detection of high accuracy may be effected independently of the accuracy of the road data.

(Embodiment 9)

Figure 27:
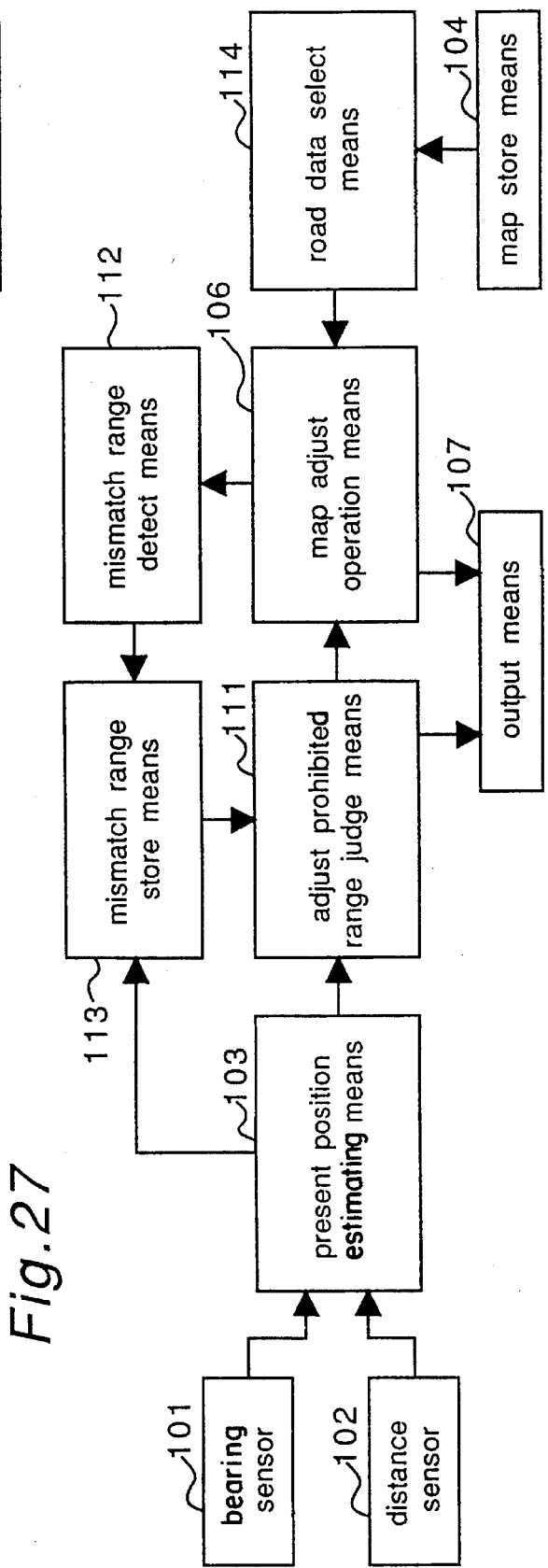
FIG. 27 is a block diagram of a vehicle position detecting apparatus in a ninth embodiment of the present invention.

A ninth embodiment of the present invention will be described hereinafter. FIG. 27 shows a block diagram of the present embodiment. FIG. 27 is the same except for a portion where the running locus computed by the present position estimating means 103 is stored together with the non-matching region by the non-matching region storing means 113.

In the ninth embodiment, the object is that the running locus is stored together at a storing time of the non-matching region, the practice of the map matching is changed in judgment by the advancing detection and the passing road at the same region, the map matching is prohibited only when the same running locus as at the storing time is provided in the non-matching region so that the positional detection of high accuracy independently of the errors of the road data.

Figure 32A:
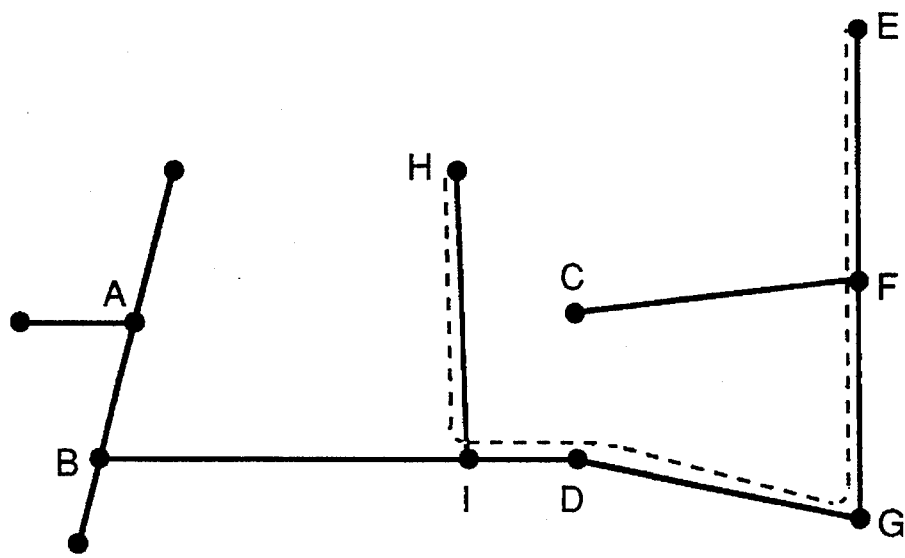
FIGS. 32 (a) and 32 (b) are views for illustrating the ninth embodiment.
Figure 32B:
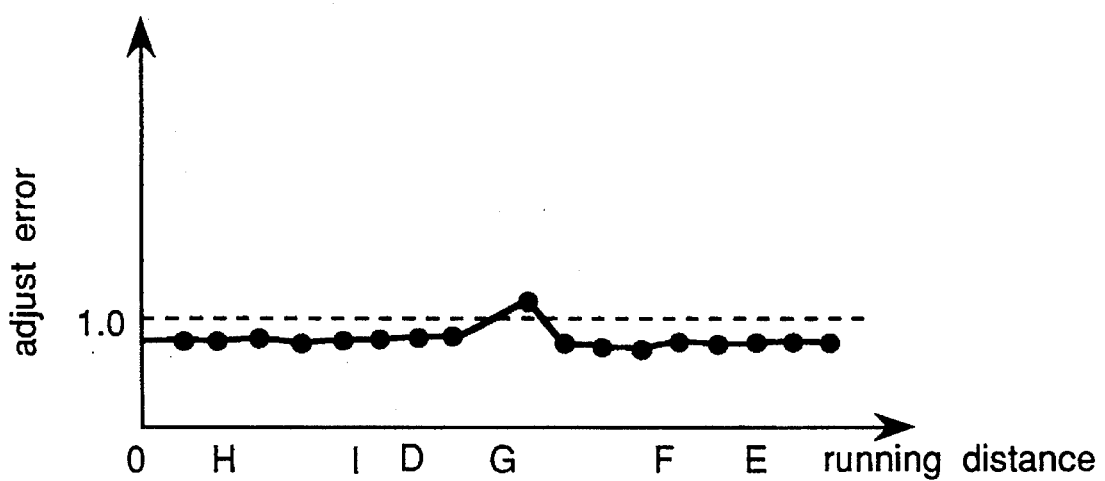
Figure 33:
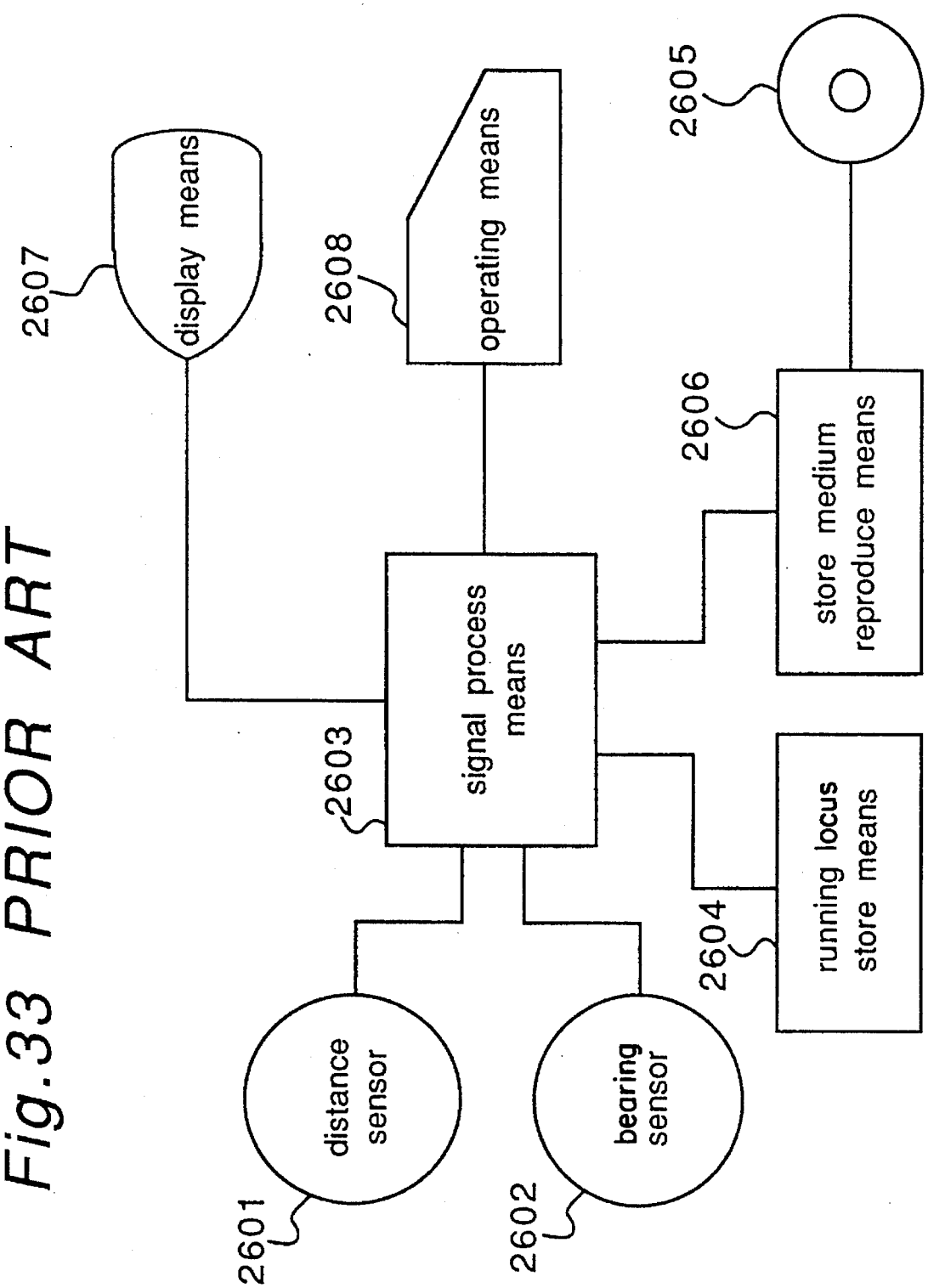
FIG. 33 is a block diagram of the conventional vehicle position detecting apparatus.

The operation of the present embodiment will be described with reference to FIG. 32. FIG. 32 has a road HI added to similar road data to FIG. 31, with the roads being described with solid lines. Even in the embodiment, the road is assumed to exist between the AC. The locus when the vehicle has run H→I→D→G→F→E. In FIG. 32, the matching error of the locus and the road data in the embodiment is computed with the use of the (4) formula as in the eighth embodiment, is made graphic. In the drawing, the matching error is normally a given value (in the embodiment, 1.0) or lower. As the error of the road data can be judged small, the match computing operation is not necessary to be prohibited.

When the vehicle has passed in the order of A→C →F→E in the region as in the eighth embodiment, the portion between the AC becomes an non-matching region because of absence of the road data between the AC. As the road HI passes through the non-matching region, the matching computing operation in the region is not performed independently of high accuracy of the road data. The map matching operation is prohibited only when the running locus the same as the non-matching region and at the storing time.

The flow of the processing is similar to that of the eighth embodiment, and will be described with reference to FIG. 29, 30. The operations except for the step 204 and the step 309 are the same as in the first embodiment. The running locus is made at a step 203, and the running locus immediately after the entrance into the non-matching region is stored at the same time with the storing of the non-matching region at the step 309. At a step 404, the estimating portion is within the match prohibition region and it is judged whether or not the running locus is the same as the locus stored. When two conditions are satisfied, the step moves to a step 207 so as to display the estimating position without the map matching computing operation being effected. Only the running locus immediately after entrance of the estimating position into the non-matching region is stored, it is judged whether or not the estimating position is within the match prohibiting region after it has been judged that the map match computation is once prohibited at a step 204.

Accordingly to the present embodiment described hereinabove, only when the vehicle runs on the road low in the matching property to the running locus even within the same region, the prohibition of the matching computation prevents the detection of the present position onto the road large in the error, so that the detection of the stable present position can be effected. Accordingly, in the road high in the using frequency, the position detection of the high accuracy can be effected independently of the accuracy of the road data.

Therefore, as a first means, in the present embodiment, a portion large in the error of the road data from the result of the map match computation by the non-matching region detecting means is detected as a first means so as to store it by the non-matching region storing means. Subsequently, the prohibition of the matching computing at the region is prohibited by the match prohibiting region judging means prevents the detection of the present position onto the road large in the error, the detection of the stable present position can be effected.

As a second means, only when the non-matching region and the running locus are together stored by the non-matching region storing means, the estimating position is within the non-matching region and the same running locus as at the storing time is provided, the map matching is prohibited so that the stable present position can be detected because of prevention of the detection of the present position onto the road large in error.

Although the present invention has been fully described by way of example with reference to the accompanying drawings, it is to be noted that the various changes and modifications will be apparent by those skilled in the art. Therefore, unless otherwise such change and modifications depart from the scope of the present invention, they should be construed as included therein.

What is claimed is:

1. A vehicle position detecting apparatus comprising:
   a bearing sensor for detecting a running bearing of a vehicle;
   a distance sensor for detecting a running distance of the vehicle;
   a present position estimating means for estimating a present position of the vehicle with respect to a reference position in accordance with the running bearing detected by the bearing sensor and the running distance detected by the distance sensor;
   a map storing means for storing road data indicative of a road map;
   a map range selecting means for estimating an error amount of the road data stored in the map storing means and determining a range as evaluation range to be used in a map match computing operation from a portion having a small error amount;
   a map match computing means for effecting the map match computing operation so as to correct the present position on the road map with the use of the present position computed by the present position estimating means and the evaluation range selected by the map range selecting means;
   an outputting means for outputting the present position of the vehicle corrected by the map computing means;
   a bent road judging means for judging whether the vehicle is running on a bent road, wherein a tolerance error amount used in the map match operation is increased when the vehicle is judged to run on a bent road.

2. A vehicle position detecting apparatus as defined in claim 1, further comprising a bearing correcting means for obtaining respectively a difference between the running bearing and a bearing of the road data before and after a road bend matched by the map match computing means, wherein an advancing bearing is corrected when the difference is smaller than a given value.

3. A vehicle position detecting means as defined in claim 1, where the bent road judging means increases the tolerance error amount when the number of roads in the road data within the evaluation range is a given value or lower, and the moving locus of the vehicle outputted by the present position estimating means is bent.

4. A vehicle position detecting apparatus as defined in claim 1, where the bent road judging means judges a vehicle is presently running on a bent road when an intersection point number in the road data within the evaluation range is a given value or lower, and the moving locus of the vehicle computed by the present position estimating means is bent.

5. A vehicle position detecting apparatus comprising:
   a bearing computing means for computing an advancing bearing of a vehicle;
   a distance computing means for computing a moving distance of a vehicle;
   a map storing means for storing map data indicative of a road map;
   a present position estimating means for estimating a position of a vehicle in accordance with an output of the bearing computing means and an output of the distance computing means and the map data of the map storing means;
   an outputting means for outputting a vehicle position obtained by the present position estimating means;
   an absolute position computing means for computing the latitude and longitude of the vehicle position;
   a position detecting means for obtaining a possible existence range of the vehicle with the absolute position computed by the absolute position computing means being a reference, examining the estimating position obtained by the present position estimating means and the including relation of the possible existence range;
   a distance constant correcting means for computing a distance computing error from the estimating position and the possible existence range at the terminal, correcting the distance conversion constant of the distance computing means output from the distance calibrating section length and the distance computing error, the estimating position being included in the possible existence range at a starting point of at least the distance calibrating section, and being not included at a terminal point by the position detecting means;
   a vehicle speed computing means for computing the moving speed of the vehicle, wherein the constant correcting means corrects the distance conversion constant of the distance computing means output in a distance calibration section where the vehicle speed obtained by the vehicle speed computing means is a constant value or more.

6. A vehicle position detecting apparatus comprising:
   a bearing computing means for computing an advancing bearing of a vehicle;
   a distance computing means for computing a moving distance of a vehicle;
   a map storing means for storing map data indicative of a road map;
   a present position estimating means for estimating a position of a vehicle in accordance with an output of the bearing computing means and an output of the distance computing means and the map data of the map storing means;
   an outputting means for outputting a vehicle position obtained by the present position estimating means;
   an absolute position computing means for computing the latitude and longitude of the vehicle position;
   a position detecting means for obtaining a possible existence range of the vehicle with the absolute position computed by the absolute position computing means being a reference, examining the estimating position obtained by the present position estimating means and the including relation of the possible existence range;
   a distance constant correcting means for computing a distance computing error from the estimating position and the possible existence range at the terminal, correcting the distance conversion constant of the distance computing means output from the distance calibrating section length and the distance computing error, the estimating position being included in the possible existence range at a starting point of at least the distance calibrating section, and being not included at a terminal point by the position detecting means;
   a road type judging means for specifying a road type on which the vehicle is running using the map data of the map storing means, wherein the distance constant correcting means corrects the distance conversion constant of the distance computing means outputs in a distance calibration section judged to be a high speed road or a toll road by the road type judging means.

7. A vehicle position detecting apparatus as defined in claim 5 or 6, further comprising a road length computing means for obtaining the moving distance of the vehicle as an integration value of the length of the road using the map data of the map storing means, wherein the distance constant correcting means corrects a distance conversion constant of the distance computing means output using the road length obtained by the road length computing means.

8. A vehicle position detecting apparatus comprising:

a bearing sensor for detecting an advancing bearing of a vehicle;

a distance sensor for detecting a running distance of the vehicle;

a present position estimating means for computing a running locus of the vehicle in accordance with the advancing bearing detected by the bearing sensor and the running distance detected by the distance sensor, and for computing an estimated present position of the vehicle;

a map storing means for storing road data indicative of a road map;

a road data selecting means for selecting a road data to be used for a map matching computation from among the road data stored by the map storing means;

a map match computing means for effecting a match computing operation to obtain a present position of the vehicle on the road map by matching the running locus of the vehicle and the the road data;

a non-matching region detecting means for detecting a non-matching region of the road data for which the running locus of the vehicle does not match during the match computing operation carried out by the map match computing means;

a non-matching region storing means for storing the non-matching region detected by the non-matching region detecting means;

a match prohibiting region judging means for comparing the present position detected by the present position estimating means with the non-matching region stored by the non-matching region storing means so as to judge an employment of the map match computation; and an outputting means for outputting the estimated present position or a recent position on the road.

9. A vehicle position detecting apparatus as defined in claim 8, where the non-matching region storing means stores the non-matching region detected by the non-matching region detecting means and a running locus detected by the present position estimating means, a means prohibiting region judging means effects a region judgement for judging whether the estimated position detected by the present position estimating means is within the non-matching region stored by the non-matching region storing means, and a locus judgment for judging whether the running locus detected by the present position estimating means conforms to the running locus stored by the non-matching region storing means so as to effect an execution judgement of the map match computation.

* * * * *